United States Patent
Joisha

(10) Patent No.: US 7,565,386 B2
(45) Date of Patent: Jul. 21, 2009

(54) REFERENCE-COUNTING SUBSUMPTION ANALYSIS

(75) Inventor: Pramod Gundimajalu Joisha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/351,642

(22) Filed: Feb. 10, 2006

(65) Prior Publication Data

US 2007/0226281 A1 Sep. 27, 2007

(51) Int. Cl.
*G06F 12/00* (2006.01)
*G06F 17/30* (2006.01)

(52) U.S. Cl. .................. 707/206; 707/200; 707/205
(58) Field of Classification Search ............... None
See application file for complete search history.

(56) References Cited

U.S. PATENT DOCUMENTS

| | | | | |
|---|---|---|---|---|
| 5,218,698 | A * | 6/1993 | Mandl | 711/165 |
| 6,199,082 | B1 * | 3/2001 | Ferrel et al. | 715/205 |
| 6,449,626 | B1 * | 9/2002 | Garthwaite et al. | 707/206 |
| 6,879,991 | B2 * | 4/2005 | Bacon | 707/206 |
| 7,024,437 | B2 * | 4/2006 | Garthwaite | 707/206 |
| 7,216,136 | B2 * | 5/2007 | Bacon et al. | 707/206 |
| 2002/0161792 | A1 * | 10/2002 | Garthwaite | 707/206 |
| 2003/0191783 | A1 * | 10/2003 | Wolczko et al. | 707/206 |
| 2007/0022149 | A1 * | 1/2007 | Bacon et al. | 707/206 |

OTHER PUBLICATIONS

Chase, David, "Garbage Collection and Other Optimizations", PhD Thesis, Rice U. Computer Science Department, Nov. 1987.*
Ritzau, Tobias, "Memory Efficient Hard Real-Time Garbage Collection", Linköping University, Department of Computer and Information Science, Jun. 20, 2003, ISBN: 91-7373-666-X.*

(Continued)

*Primary Examiner*—Tim T. Vo
*Assistant Examiner*—Jay A Morrison
(74) *Attorney, Agent, or Firm*—Klarquist Sparkman, LLP

(57) ABSTRACT

An eager reference-counting garbage collection system performs a static analysis on the intermediate representation of a program. The system then uses liveness information to inject eager reference-counting updates into the program. Through the use of the liveness information, reference-counting decrements can be made earlier in execution than in traditional reference-counting schemes, freeing up memory more efficiently. Additionally, a reference-counting subsumption optimization tool identifies redundant reference-counting updates and removes them, lowering the number of garbage collection update calls and improving execution throughput. Reference-counting subsumption can also be used as a throughput enhancer in traditional reference-counting schemes that maintain up-to-date tallies of references from the stack.

13 Claims, 16 Drawing Sheets

OTHER PUBLICATIONS

Garbage Collection Algorithms for Automatic Dynamic Memory Management, by Jones et al., Publisher: John Wiley & Sons Ltd, West Sussux, England, Published: 1996, ISBN: 0471941484, pp. 56-59.*

David F. Bacon and V.T. Rajan. Concurrent Cycle Collection in Reference Counted Systems. In *Proceedings of the 15th European Conference on Object-Oriented Programming*, vol. 2072 of *Lecture Notes in Computer Science*, pp. 207-235. Springer-Verlag, Jun. 2001.

Henry G. Baker. Minimizing Reference Count Updating with Deferred and Anchored Pointers for Functional Data Structures. *ACM SIGPLAN Notices*. 29(9):38-43, Sep. 1994.

Jeffrey M. Barth. Shifting Garbage Collection Overhead to Compile Time. *Communications of the ACM*, 20(7):513-518, Jul. 1977.

Stephen M. Blackburn and Kathryn S. McKinley. Ulterior Reference Counting: Fast Garbage Collection without a Long Wait. In *Proceedings of the 18th ACM SIGPLAN Conference on Object-Oriented Programming, Systems, Languages, and Applications*, pp. 344-358, Oct. 2003.

George E. Collins. A Method for Overlapping and Erasure of Lists. *Communications of the ACM*, 3(12):655-657, Dec. 1960.

John DeTreville. Experience with Concurrent Garbage Collectors for Modula-2±. Technical Report SRC-RR-64. Digital Systems Research Center, Nov. 1990.

Alan Deutsch. On Determining Lifetime and Aliasing of Dynamically Allocated Data in Higher-Order Functional Specifications. In *Proceedings of the 17th ACM SIGPLAN-SIGACT Symposium on Principles of Programming Languages*, pp. 157-168. Association for Computing Machinery, Jan. 1990.

Sanjay Ghemawat, Keith H. Randall, and Daniel J. Scales. Field Analysis: Getting Useful and Low-Cost Interprocedural Information. In *Proceedings of the ACM SIGPLAN Conference on Programming Language Design and Implementation* [1], pp. 334-344.

Paul Hudak. A Semantic Model of Reference Counting and its Abstraction (Detailed Summary). In *Proceedings of the ACM Conference on LISP and Functional Programming*, pp. 351-363. Association for Computing Machinery, Apr. 1986.

Young Gil Park and Benjamin Goldberg. Reference Escape Analysis: Optimizing Reference Counting based on the Lifetime of References. In *Proceedings of the ACM SIGPLAN Symposium on Partial Evaluation and Semantics-based Program Manipulation*, pp. 178-189. Association for Computing Machinery, Jun. 1991.

Cristina Ruggieri and Thomas P. Murtagh. Lifetime *Analysis of Dynamically Allocated Objects*. In *Proceedings of the 15th ACM SIGPLAN-SIGACT Symposium on Principles of Programming Languages*, pp. 285-293. Association for Computing Machinery, Jan. 1988.

Chris Sells and Christopher Tavares. Adding Reference Counting to the Shared Source Common Language Infrastructure. At http://www.sellsbrothers.com/writing.

Bjarne Steensgaard. Thread-Specific Heaps for Multi-Threaded Programs. In *Proceedings of the 2nd International Symposium on Memory Management*, pp. 18-24. Association for Computing Machinery, Oct. 2000.

Martin T. Vechev and David F. Bacon. Write Barrier Elision for Con-current Garbage Collectors. In *Proceedings of the 4nd International Symposium on Memory Management*, pp. 13-24. Association for Computing Machinery, Oct. 2004.

* cited by examiner

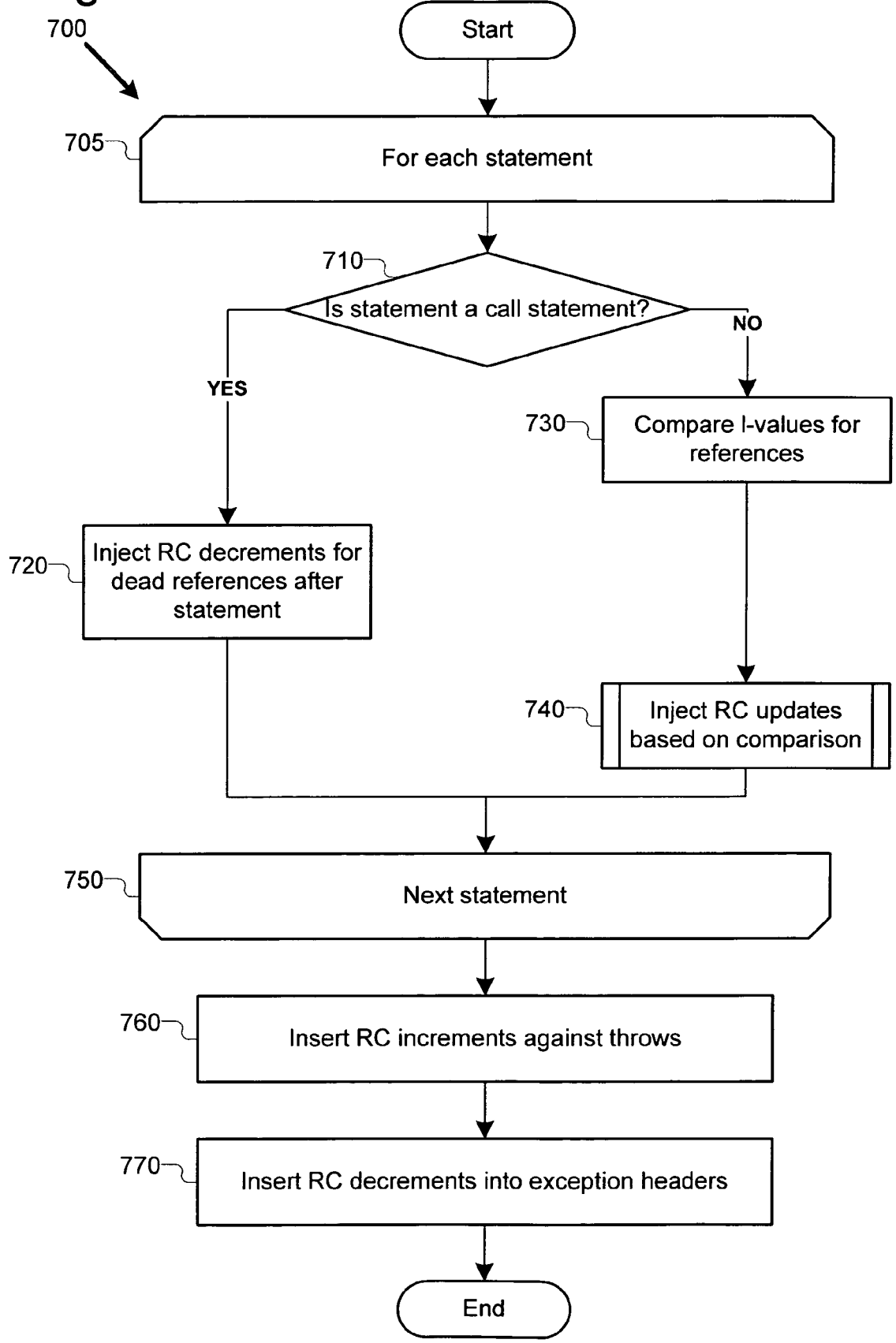

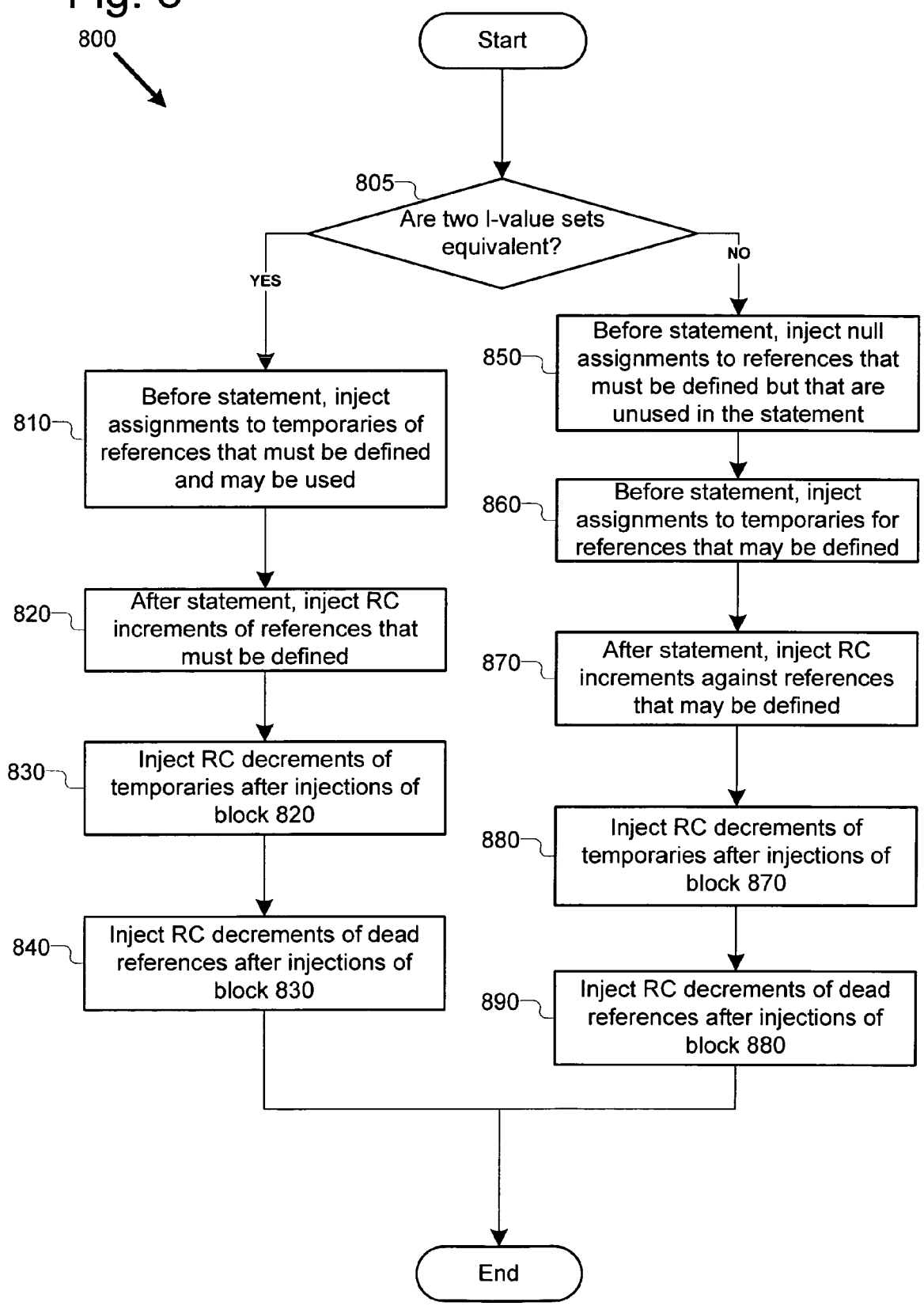

1  x := ...
2  ▷ $RC_+(x)$ 3  y := x
4  ▷ $RC_+(y)$

5  ...:= ...y...
6  ▷ $RC_-(y)$

7  ...:= ...x...
8  ▷ $RC_-(x)$

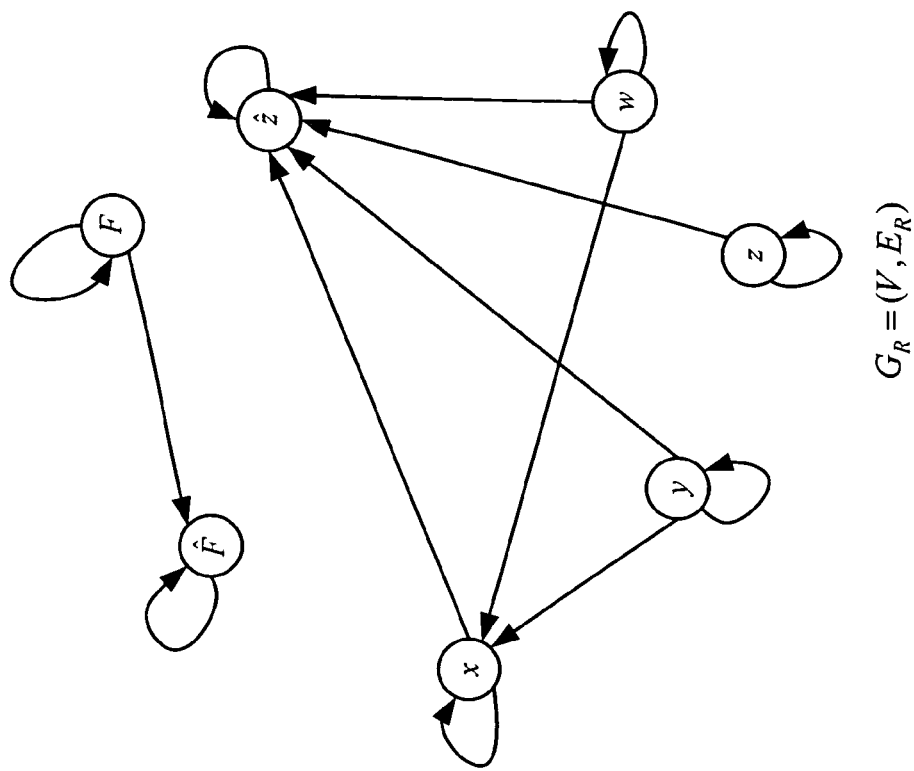
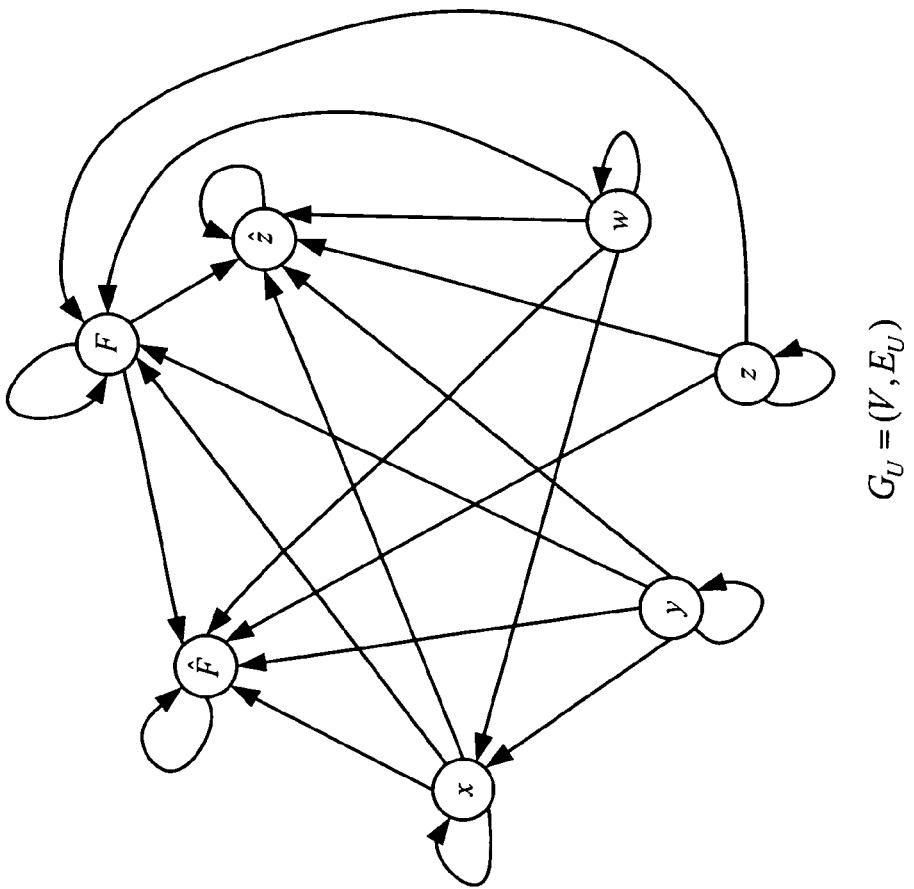
Fig. 15b
Fig. 15a

Software 1680 Implementing Eager RC
Insertion and Subsumption Analysis
Techniques

REFERENCE-COUNTING SUBSUMPTION ANALYSIS

BACKGROUND

The vast majority of computer systems allow programs to dynamically allocate memory to data structures during execution. While dynamic allocation provides flexibility to programmers, systems which allocate memory must also find a way to identify and deallocate memory locations that are no longer being used during execution. Such techniques, which are generally known as garbage collection, allow for efficient use of memory, and prevent programs from running out of resources.

The efficiency of garbage collection schemes is often measured by reference to "throughput" and "pause time" metrics. Generally, "throughput" refers to the performance of a garbage collection technique. Specifically, the throughput of a program can be measured by the inverse of its execution time while using a particular garbage collection scheme. By another method of measurement, throughput is related to the amount of memory that can be reclaimed per amount of time that a program is executing. In the description to follow, we shall use throughput to mean the former description. Pause time, by contrast, is the amount of time taken up as the main program is prevented from executing while a garbage collector locates and reclaims memory.

Garbage collection methods are typically distinguished by the methods through which they identify memory locations that can no longer be reached during execution and how these methods affect throughput and pause time. For example, one collection technique called indirect collection periodically pauses execution of a main program in order to traverse memory references and identify memory locations that are no longer reachable by the program. While indirect-collection techniques usually show a relatively high throughput, as they combine reclamation of many memory locations into a single traversal, they tend to have high, and oftentimes unbounded, pause times.

By contrast, another technique, known as reference-counting ("RC") garbage collection, reclaims memory using a count maintained against each logically independent unit of data, for example, a count $\rho(x)$ is maintained against a unit of data x. In this example, $\rho(x)$ is a tally that signifies whether there are any references to x, and changes as references to x are added and deleted. These count increments and decrements are referred to herein generally as "RC updates." A $\rho(x)$ value of zero means that there are no references to x, at which point it is safe to reclaim x. RC techniques, generally, are superior to indirect-collection techniques in the pause time metric, because garbage collection calls are usually of bounded time. However, these techniques, through their frequent calling of garbage collection routines, can cause throughput to suffer.

Moreover, some traditional RC implementations are based on a reachability view of memory management. That is, RC updates are applied just when references are actually destroyed (either due to a redefinition or due to a reference going out of scope) or created, or after that. This could cause garbage objects to be held long after the references to them are last used, resulting in a program consuming more memory than needed.

Thus there remains room for improving the execution time and peak memory usage characteristic of the RC garbage collection technique.

SUMMARY

A systematic compiler-oriented methodology for inserting RC increments and decrements (collectively referred to as RC updates) is described. The methodology takes into account stack reference lifetimes determined through static program analysis to update the stack contribution to reference counts more eagerly than in the traditional, nondeferred, reachability-based style of RC collection (herein referred to as "classic" RC collection). The methodology has been couched in general terms to cover modern object-oriented instruction sets and features such as exceptions, interior pointers and object pinning.

An optimization called reference-counting subsumption is also described that statically identifies and eliminates redundant RC updates on stack references. This optimization can significantly improve the throughput of the above described eager RC collection method, as well as that of classic RC collection.

Thus, in one example a method is described for lowering a number of reference-counting updates in a program utilizing reference-counting garbage collection. In one example, the method comprises determining subsumed references which are subsumed by subsuming references in the program and removing reference-counting updates on the subsumed references.

In another example, a computer-executable program analysis system for determining redundant reference-counting updates in a program is described. In one example, the system comprises a reference-counting subsumption analysis module which is configured to accept a control-flow graph for a program and produce one or more reference-counting subsumption graphs which indicate references in the control-flow graph that are subsumed by other references.

In yet another example, one or more computer-readable media are described which comprise computer-executable instructions for performing a method for identifying unnecessary reference-counting updates in a function contained in a program that uses reference-counting garbage collection. In one implementation, the method comprises determining references which are subsumed in the function and removing reference-counting updates for the subsumed references from the function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

BRIEF DESCRIPTION OF THE DRAWINGS

FIG. 7 is a flowchart illustrating an example process for injecting eager reference-counting updates into an internal compiler representation of a program.

FIG. 8 is a flowchart illustrating a further example process for injecting eager reference-counting updates into an internal compiler representation of a program.

FIGS. 15a and 15b are examples of two graphs created during the process of FIG. 11 while performing an RC subsumption analysis on an internal compiler representation of a program.

DETAILED DESCRIPTION

Figure 1:
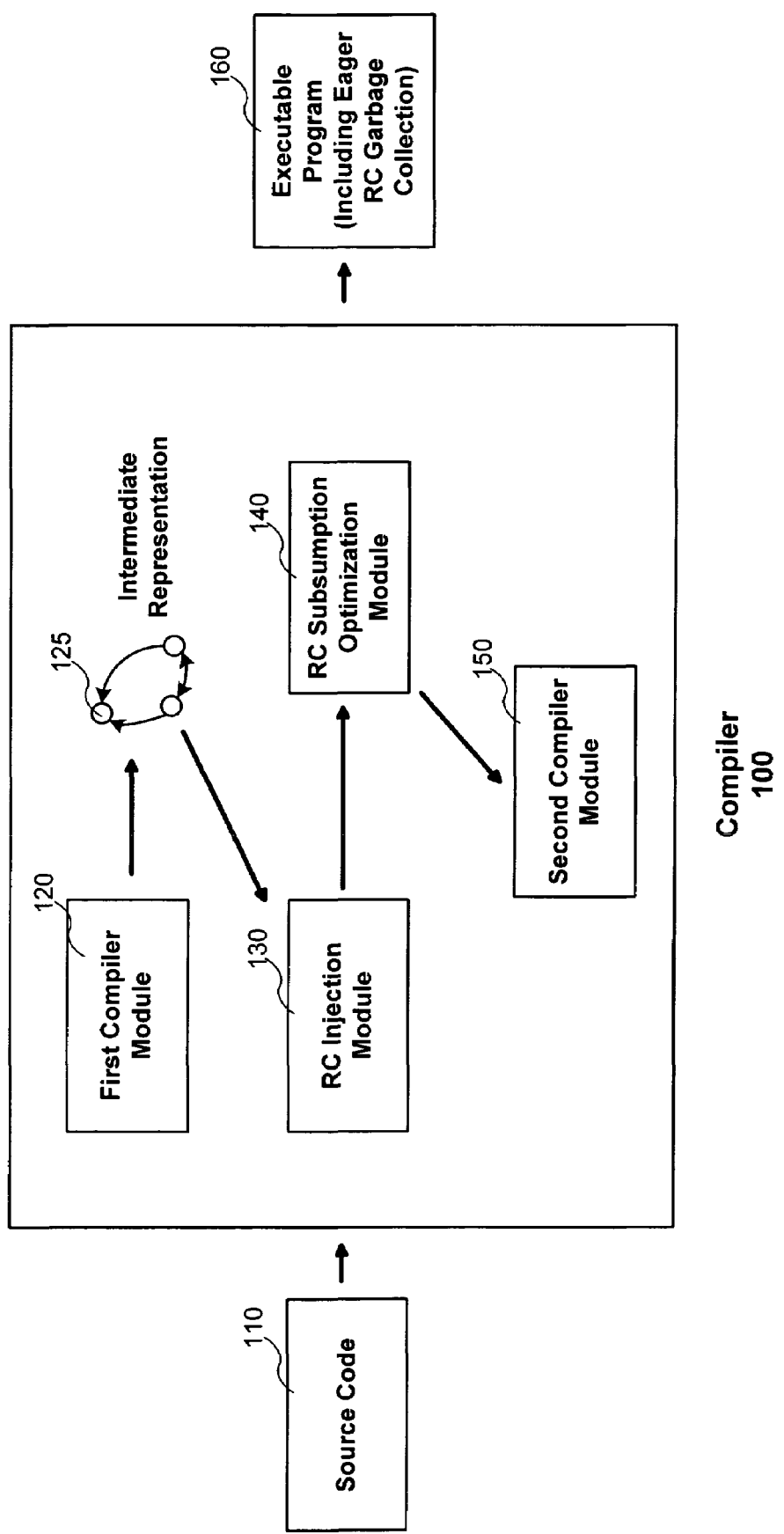
FIG. 1 is a block diagram of a compiler incorporating eager reference-counting and reference-counting subsumption techniques.

Some existing RC garbage collection techniques ensure an always up-to-date value for $\rho(x)$. That is, using these techniques, an object's reference count is increased or decreased immediately before a reference to it is created or destroyed. Another class of RC techniques maintains $\rho(x)$ lazily and thus does not necessarily update RC counts immediately upon a reference being created or destroyed. Sometimes these lazy techniques are used to lower the number of calls that are made to RC functions, which improves the throughput. The tradeoff, however, is that these lazy techniques potentially allow unused memory to sit for an unacceptably long period of time without being reclaimed.

These techniques are contrasted by what can be called "eager" RC techniques, which could update $\rho(x)$ ahead of references actually materializing and disappearing. For example, if a reference l to an object x is no longer used, then $\rho(x)$ can be decremented ahead of l being overwritten or going out of scope. Such a technique, if efficiently implemented, could provide more immediate reclamation of memory than existing RC techniques while preserving reference counting's generally well-regarded pause times. Additionally, if redundant RC updates could be identified and eliminated before execution, the number of garbage collection calls made during execution could be reduced, improving throughput of RC techniques generally. However, because classic RC collection has never been regarded as a viable high-throughput garbage collection technique, little work has been done to improve the execution performance of such garbage collection systems and techniques.

The following description relates to modifying a program to support eager RC garbage collection. The techniques described herein can process a compiler's internal representation ("IR") of a program to produce a normal form of the program and then perform a liveness analysis on the program to determine reference lifetimes and thus points at which RC updates may be performed eagerly. Then RC updates are injected into the IR to support garbage collection based on the reference lifetimes. Through this analysis and injection at the proper points, the eager RC techniques described herein provide quicker reclamation of memory than other RC techniques, while still providing the bounded pause times which are a hallmark of RC garbage collection. These techniques and systems can be integrated into a compiler, providing garbage collection support during compilation.

Additionally, subsumption techniques are described which utilize a static program analysis to determine references that are subsumed by other references, and whose RC updates are thus redundant. In particular, the techniques generate an RC subsumption graph which identifies subsumed references. RC updates on these references are then eliminated, reducing the number of RC calls in the program, and thus improving throughput.

1. Examples of Supported Language Features

The techniques and systems described herein will generally be described with reference to the IR of an input program. This is done because the techniques described herein are generally not language-specific, and also because the techniques can be readily integrated into compilation procedures by being based on the manipulation of a compiler IR.

In various implementations, RC updates could be inserted into a compiler's intermediate representation at various points in a pipeline of phases: either when the IR is at a high level, medium level or after it has been lowered into whichever native code the compiler is configured to produce. Inserting RC updates into the high-level IR permits optimization opportunities that may not be identifiable in other IRs. Implementations which utilize modifications of high-level IRs must also ensure that the downstream phases be aware of RC updates and preserve the invariants that their insertion imposes. In alternative implementations, the analysis and insertion of RC updates could be performed on source programming language code rather than an intermediate representation.

At the IR level, the techniques described herein assume that there are two kinds of pointers relevant to garbage collection: references, which resemble the object references of Java and C#, and interior pointers ("IPs"), which resemble the managed pointers of .NET. Typically, interior pointers are similar to conventional pointers in that they are dereferenceable. However, they are associated with strong typing information and have only a limited set of operations.

As far as logical units of data are concerned in the description herein, there are two kinds: objects that reside on the heap (including arrays), and value types (like struct types) that reside on the stack. While references point to the beginning of objects, interior pointers can point to an object's beginning as well as specific places in the middle, such as, for example, fields and array elements. Ips can also point into the static data area and the stack, in which case they must target the beginning of a value type, a field thereof, or a reference. In one implementation, the syntax S of their definitions is determined by the following exemplary grammar productions:

$S ::= T := A$ $A ::= \&L \mid \&R[I] \mid \text{unbox}(R) \mid \&(W.F) \mid T \pm I$ In these grammar productions, L is the set of local value-type and reference variables, R is the set of local reference variables, T is the set of interior pointers (which are local variables), W is the set of local reference and interior pointer variables (i.e., W=R∪T), I is the set of integer-valued expressions, and F is the set of static, object and value-type fields. unbox is an operator that takes a reference to an object-version of a value type (sometimes called a boxed value type) and returns an interior pointer to its beginning. The "member access" operator ('.') extracts a field of an object or a value-type instance, given a reference or an interior pointer to it. The "address of" operator ('&') returns the address of a variable, field or array element. Thus, &(L.F) is an interior pointer to a field of a heap object or a field of a value-type stack instance, and &.F is an interior pointer to a static field.

In implementations supporting the grammar productions listed above, interior pointers cannot be stored into the heap, a field of a value type, or returned from a function. However, both references and interior pointers are allowed to be passed into functions. These restrictions are similar to those in the .NET standard of Microsoft Corporation. While the productions above do not cover all possible ways of defining interior pointers in .NET—for example, conversions from so-called unmanaged pointers to interior pointers, alternative eager RC and subsumption implementations can be modified in a straightforward manner to deal with these additional cases. Additionally, in an alternative implementation, the techniques described herein can be extended to support a language that allows IPs to be returned from a function.

Some of the descriptions herein also assume a service called findstart(p) provided by a garbage collection allocator that returns a reference to the start of the object enveloping the interior pointer p if p points into the heap, and null otherwise.

The techniques described herein support that any variable v that is either an interior pointer or a reference can carry an attribute, called pinned, that prevents the garbage collector from reclaiming (or moving) any object that v may point to until v's redefinition, or until the end of v's lexical scope.

In various language implementations, value types can contain references. These need to be properly accounted for in compiler-assisted RC collection schemes. Rather than specifically considering them and for the sake of uncluttered explanation, the techniques can assume the execution of a value-type "unwrapping" phase prior to the RC update insertion phase that replaces all field-possessing value-type variables by a series of variables corresponding to the primitive value-type fields and reference fields directly or indirectly embedded in them. This unwrapping can adjust the signatures of functions that accept or return reference-embedding value types.

Finally, the techniques support languages where statements in the IR can throw exceptions. Excluding function call instructions, it is assumed herein that when a statement throws an exception, it does so without discharging any of the external state side-effect actions that it would normally perform in the course of program execution, with the external state being the heap, stack and static data. The action of throwing an exception could be implicit, such as when the divisor in a division instruction is zero. For explicitly throwing exceptions, it can be assumed that the IR provides a throw statement, which is allowed to occur only at the end of basic blocks.

2. Examples of Eager Reference Counting and Subsumption Architectures

FIG. 1 is a block diagram illustrating components of a compiler which incorporates the eager RC garbage collection and RC subsumption optimization techniques and systems described herein. In another implementation, components of FIG. 1, as well as their functions, may be found in a translator rather than a compiler. Note that while the example implementation illustrates particular software modules for the sake of illustration, in alternative implementations, one or more of the illustrated modules may be merged, divided into additional modules, or omitted altogether.

FIG. 1 illustrates a sample compiler 100 which accepts programming language source code 110 as input and outputs an executable program 160 which implements eager RC garbage collection. Examples of source code include, but are not limited to, programming language code such as C++, Java, C# and .NET. In alternative implementations, the source code 110 may include code which operates at a higher or lower level than traditional programming language code, such as, for example, script code or assembly code. The compiler 100 creates optimized eager RC-instrumented executable programs by integrating an RC injection module 130 and an RC subsumption optimization module 140.

It should be noted that, as used in this application, the terms "optimize," "optimized," "optimization" and the like are terms of art that generally refer to improvement without reference to any particular degree of improvement. Thus, in various scenarios, while an "optimization" may improve one or more aspects of the performance of a system or technique, it does not necessarily require that every aspect of the system or technique be improved. Additionally, in various situations, "optimization" does not necessarily imply improvement of any aspect to any particular minimum or maximum degree. Finally, while an "optimized" system or technique may show performance improvement in one or more areas, it may likewise show a decrease in performance in other areas. In the particular circumstances described below, while optimizations will result in the removal of redundant or superfluous RC updates, possibly providing increased performance, these optimizations should not imply that every possible RC update will be identified or removed.

As FIG. 1 illustrates, in a preferred implementation, the input programming language source code 110 is partially compiled by a first compiler module 120 into an intermediate representation 125. In the illustrated implementation, the IR 125 is a control-flow graph ("CFG"), while in other implementations, as mentioned above, the IR maybe higher or lower in the compilation process.

In a typical CFG implementation, nodes in the CFG are basic blocks and arcs depict the control flow between them. CFG edges are of two types: normal arcs that denote the normal flow of control from the end of one basic block to the beginning of another, and exception arcs that represent the flow of control from anywhere within a basic block to the header block of an exception handler. In one implementation, exception header blocks contain a special statement called an exception assignment that catches and assigns the thrown exception to an exception variable. This statement is assumed to have the form x:=catch( ), where catch is an IR opcode, and is classified as a function call instruction for the purposes of this description.

After creation of an IR 125, the IR 125 is passed to an RC injection module 130 that serves to add instrumentation for eager RC garbage collection, and then to an RC subsumption optimization module 140 where RC updates on RC-subsumed references are identified and removed. Particular implementations of these processes will be described in greater detail below. Finally, the IR with RC instrumentation added to it is passed to a second compiler module 150 for compilation into the executable program 160.

Figure 2A:
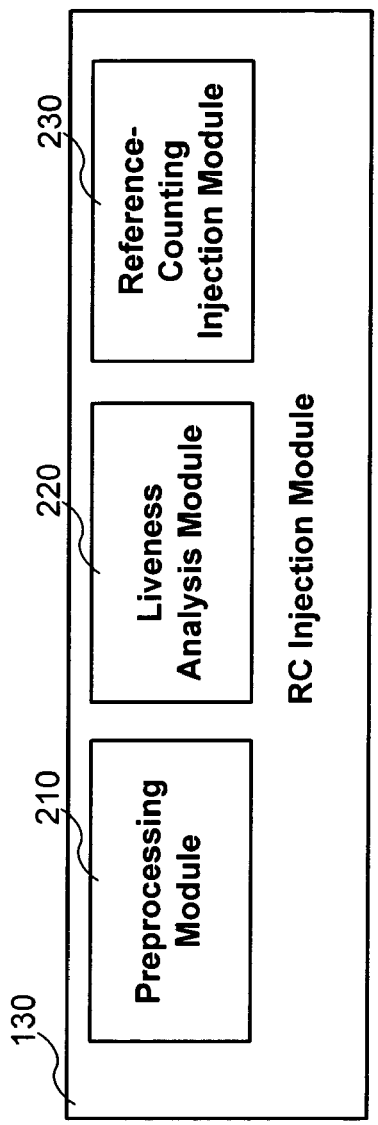
FIGS. 2a and 2b are block diagrams of reference-counting injection and RC subsumption optimization modules.
Figure 2B:
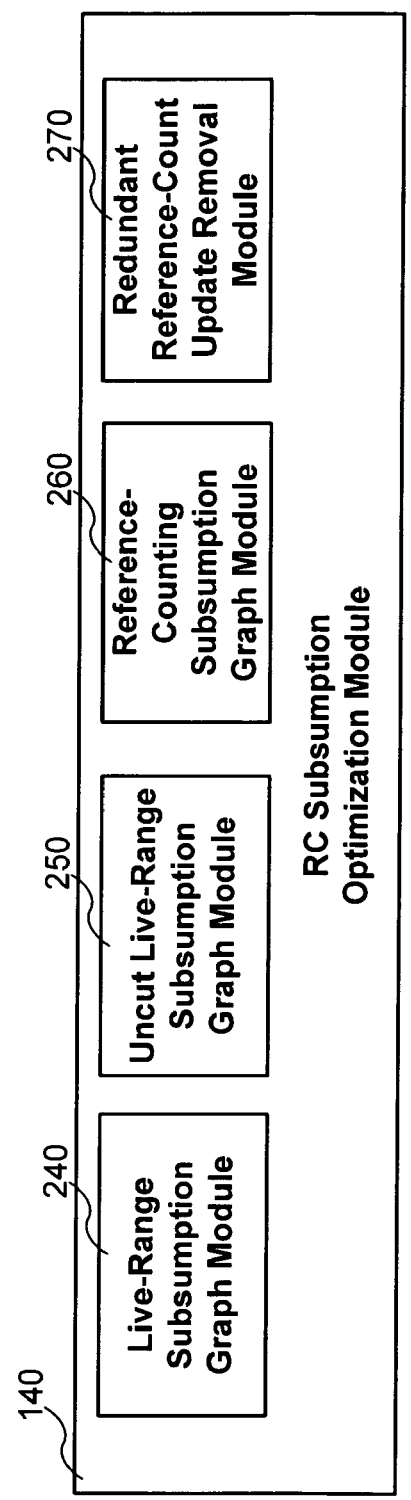

FIGS. 2a and 2b are block diagrams illustrating example implementations of the RC injection module 130 and the RC subsumption optimization module 140. While the illustrated implementations divide functions of the RC injection module 130 and the RC subsumption optimization module 140 into particular illustrated modules, in alternative implementations, the illustrated modules can be combined, divided further, or omitted.

The illustrated RC injection module 130 of FIG. 2a comprises three modules which perform the tasks of preparing, analyzing, and modifying an IR of a program to support eager RC garbage collection. The first illustrated module is the preprocessing module 210, which converts an IR into a normal form for further processing. The second illustrated module is a liveness analysis module 220 which analyzes the IR to determine when references are live within the program; these live references can then be used to determine points at which eager RC updates are to be inserted. This insertion is performed by the third illustrated module, the RC injection module 230, which, based on the liveness information determined by the liveness analysis module 220, injects the IR with RC updates to provide for eager RC garbage collection. Particular implementations of the processes performed by these modules will be described in greater detail below.

The illustrated RC subsumption optimization module 140 of FIG. 2b comprises four modules which perform the tasks of analyzing a program and removing redundant RC updates. Modules 240, 250 and 260 work together to perform analyses of programs. The first of the illustrated modules is the live-range subsumption graph module 240, which creates one or more live-range subsumption graphs from a program that has been instrumented with RC updates. The second illustrated module is the uncut live-range subsumption module 250, which takes live-range subsumption graphs generated by the live-range subsumption graph module 240 and creates one or more uncut live-range subsumption graphs. The third illustrated module is the RC subsumption graph module 260, which takes uncut live-range subsumption graphs generated by the uncut live-range subsumption graph module 250 and creates one or more RC subsumption graphs. The final illustrated module is the redundant RC update removal module 270, which utilizes the one or more RC subsumption graphs generated by the RC subsumption graph module 260 to identify and remove redundant RC updates. Particular definitions of these graphs and examples of processes for making them are discussed in detail below.

3. Examples of Eager RC Transformation Processes

Figure 3:
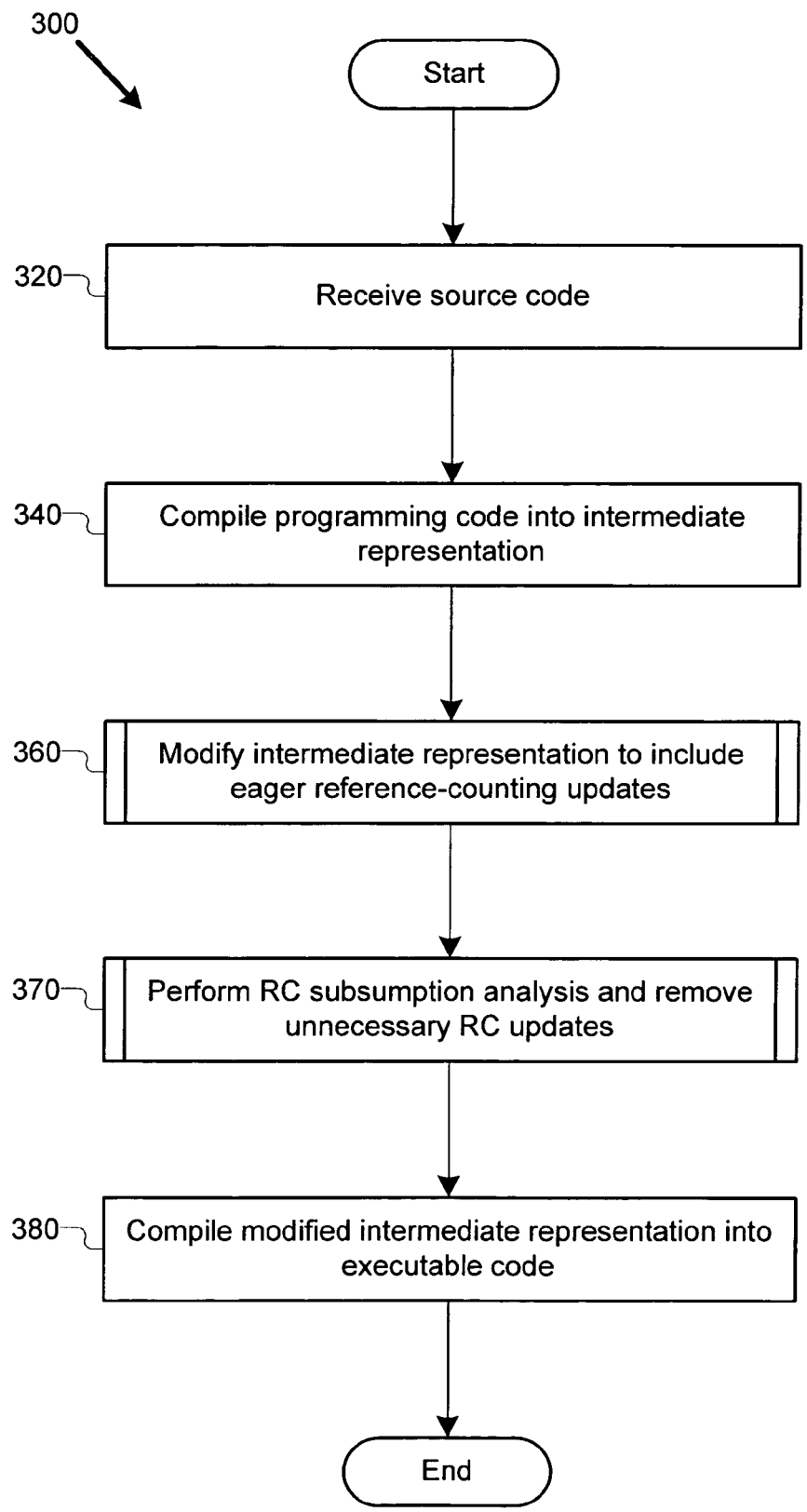
FIG. 3 is a flowchart illustrating an example process for modifying a program to support eager reference-counting garbage collection.

FIG. 3 is a flowchart illustrating an example process 300 performed by the compiler 100 for performing the RC injection and RC subsumption optimization processes. In various implementations, the illustrated process blocks may be merged, divided into subblocks, or omitted. The process starts at block 320, where source code is received by the compiler. Next, at block 340, the code is compiled by the compiler 100 into an intermediate representation. The process then continues to block 360 where the IR is modified to include eager RC updates. The examples of this process are described in greater detail below with respect to FIG. 4. Next, process 300 continues to block 370, where an RC subsumption analysis is performed by the compiler 100 to identify and remove unnecessary RC updates. Finally, at block 380, the compiler 100 compiles the modified IR into executable code and the process ends.

Figure 4:
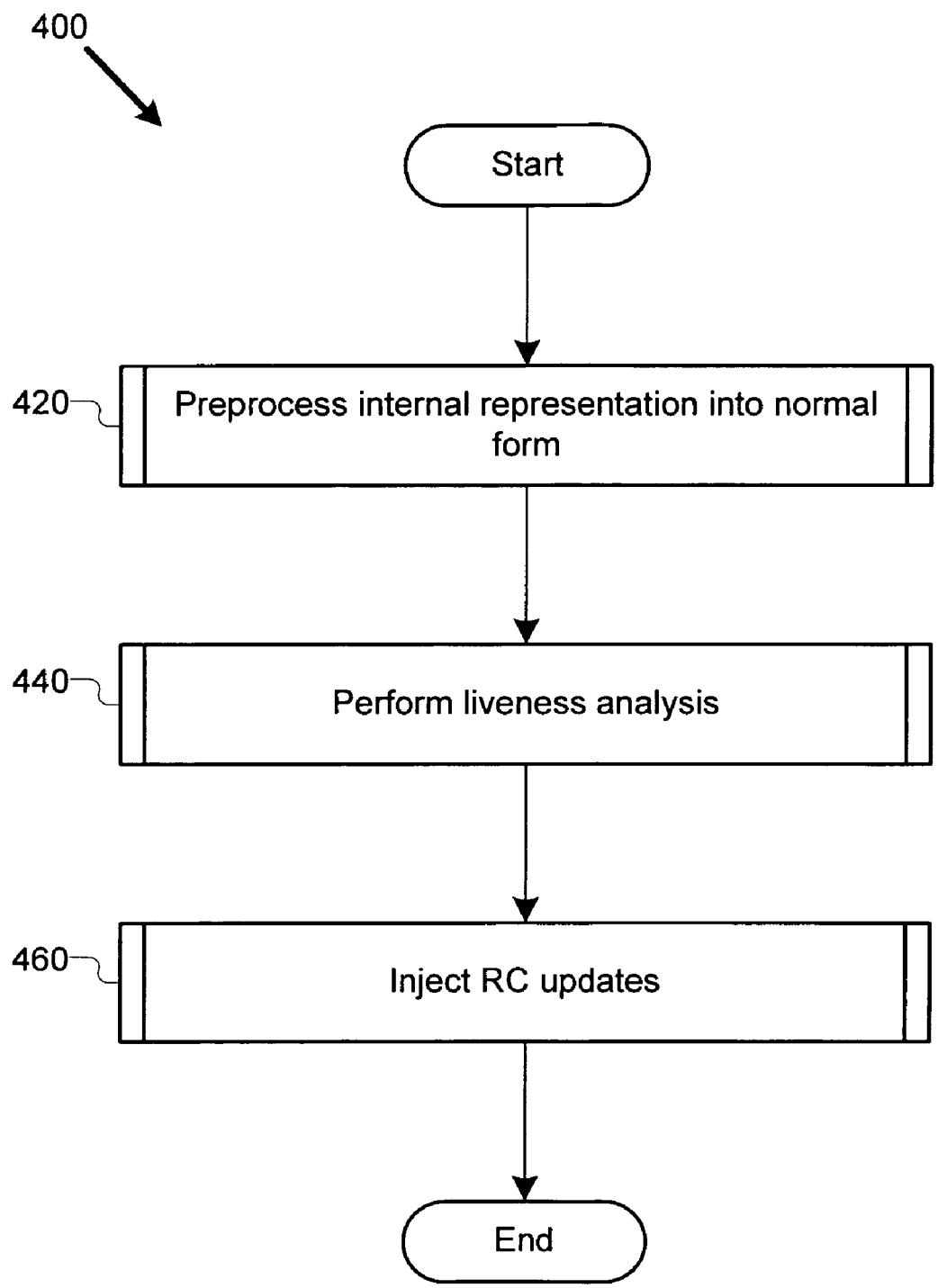
FIG. 4 is a flowchart illustrating an example process for modifying an internal compiler representation of a program to support eager reference-counting garbage collection.

Generally, the processes described herein for inserting eager RC garbage collection instrumentation comprise three stages. FIG. 4 illustrates an example three-stage process 400 performed by the RC injection module 130 for inserting RC garbage collection instrumentation. In one implementation, process 400 corresponds to block 360 of FIG. 3. In various implementations, the illustrated process blocks may be merged, divided into subblocks, or omitted.

The process begins at block 420, where the preprocessing module 210 preprocesses the IR, produced by the compiler 100, into a normal form. This normal form provides that references returned from functions are not lost; if these references were not captured, memory leaks could arise. The normal form also provides that the actual-to-formal copying of reference parameters at call sites is automatically handled at later stages and that the definitions and deaths of interior pointers can be ignored by the later stages.

Next, at block 440, the liveness analysis module 220 performs a live-range analysis on local references, modified to model the object lifetime semantics of pinned references. In one implementation, this second stage can be implemented using known live-range analysis techniques which are modified to handle the semantics of pinned references. Next, the RC injection module 230 introduces RC updates against local and heap references; their placement being guided by the liveness information previously derived in the second stage.

3.1 Preprocessing Examples

Figure 5:
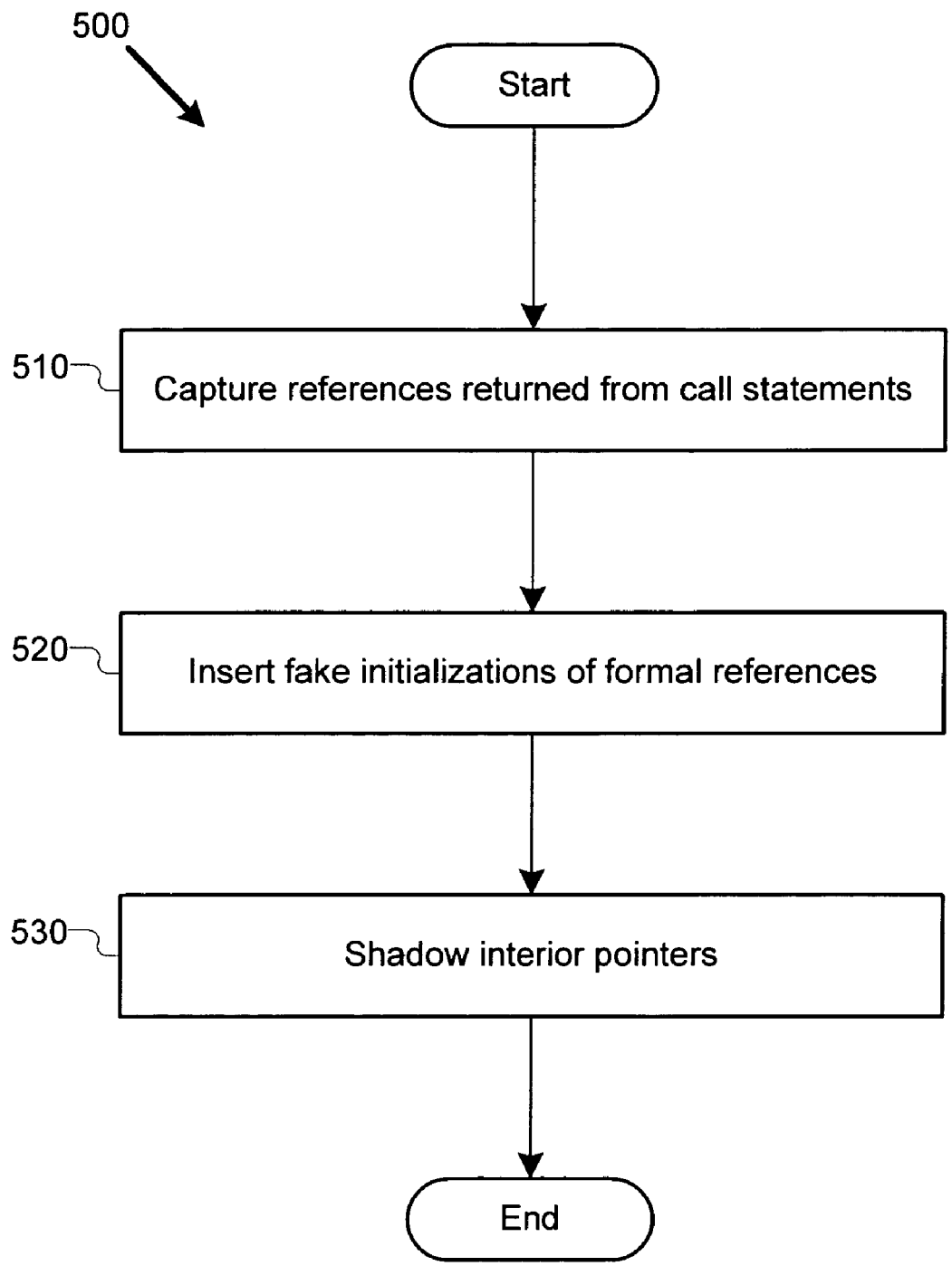
FIG. 5 is a flowchart illustrating an example process for preprocessing an internal compiler representation of a program into a normal form.

FIG. 5 illustrates an example process 500 performed by the preprocessing module 210 for preprocessing an IR into a normal form. In one implementation, process 500 corresponds to block 420 of FIG. 4. In various implementations, the illustrated process blocks may be merged, divided into subblocks, or omitted. The process begins at block 510, where references returned from call statements are captured. In one implementation, this is performed by replacing IR statements of the form $$f(x, y, \ldots),$$

where $f$ is a function that returns a reference, with an IR statement $$\dot{r} := f(x, y, \ldots),$$

where $\dot{r}$ is a compiler-generated temporary.

Next, at block 520, the preprocessing module 210 introduces fake initializations of formal references. This is performed, in one implementation, by inserting initializations of the form $$z := \text{fakedef}(\,)$$

at the top of the CFG's entry basic block, for every formal reference parameter z. In one implementation, these fakedef statements are eventually lowered into no-ops, and are included only to simulate the call-by-value semantics of the parameter-passing mechanism. Preferably, they are regarded as non-call instructions in the third stage of process 400, and exist to cause the injection of RC increments against formal references immediately on entry to a function. In an alternative implementation, these semantics could be simulated by the trivial assignment z:=z; however, because of various features of some implementations of the eager RC injection process, described below, this trivial assignment solution is not preferred. Another alternative implementation could inject RC increments against the actual references on the caller side. However, this could result in more code.

Next, at process 530, the preprocessing module 210 pairs every IP with a compiler-generated reference called a shadow at various program points. In one implementation, this is done by preceding every definition of an IP with a definition that assigns its shadow to the start of its enveloping object. In addition, a pinned attribute on an IP is carried over to its shadow. The shadowing procedure also comprises following each use of an IP by a fake use of its shadow. In this way, the later stages of the RC injection processes can ignore IPs while knowing that any memory management of objects pointed to by IPs is taken care of by management of the shadows.

Different kinds of IP definitions involve different methods of creating shadows. For instance, if $\tilde{p}$ is the shadow of an interior pointer p, then in one implementation, the preprocessing module 210 inserts an assignment against a definition of p that points it into an array in the heap as follows. (Please note that for the sake of illustration, in this and subsequent examples, IR statements which are inserted by the described techniques will be denoted with the symbol ▷.)

$$p := \&r[e] \Rightarrow \quad \triangleright \tilde{p} := r$$
$$p := \&r[e]$$

Note from the syntax description above that r is a local reference variable. If, by contrast, p were defined to point into the stack (for example, by assigning the address of r to it), then in one implementation, the following code would be produced:

$$p := \&r \Rightarrow \quad \triangleright \tilde{p} := \text{null}$$
$$p := \&r$$

Other kinds of definitions involving the address-of and unbox operators can be similarly dealt with. In another example implementation, to handle definitions involving an offset calculation on an interior pointer, the compiler inserts basic blocks with the following code:

$$p := q \pm e \Rightarrow \quad \triangleright w := (q \pm e) - \tilde{q}$$
$$\triangleright \text{if } w \geq 0 \land w < sz$$
$$\tilde{p} := \tilde{q}$$
$$\text{else}$$
$$\tilde{p} := findstart(q \pm e)$$
$$\text{end}$$
$$p := q \pm e$$

In this insertion example, $\tilde{p}$ and $\tilde{q}$ are the shadows of the interior pointers p and q, e is an integer-valued expression and sz is the statically determined size of the object pointed to by $\tilde{q}$.

As mentioned above, the process of shadowing interior pointers also includes introducing a fake use of a shadow after each use of an interior pointer in the IR:

$$\ldots := \ldots p \ldots \Rightarrow \ldots := \ldots p \ldots$$
$$\triangleright fakeuse(\tilde{p})$$

Similarly to the fakedef operator, the fakeuse operator is lowered into a no-op during compilation; it is introduced here to ensure that in the live-range analysis of the second stage of process 400, the lifetime of every interior pointer is subsumed by that of its shadow.

It should also be noted that shadow references need not be passed into functions that take in IP parameters because every IP formal parameter is guaranteed after preprocessing to have an associated shadow reference up the call stack whose lifetime subsumes the call. This subsumption makes RC updates on the IP parameter redundant, and thus not necessary.

3.2 Examples of Live-Range Analysis

Figure 6:
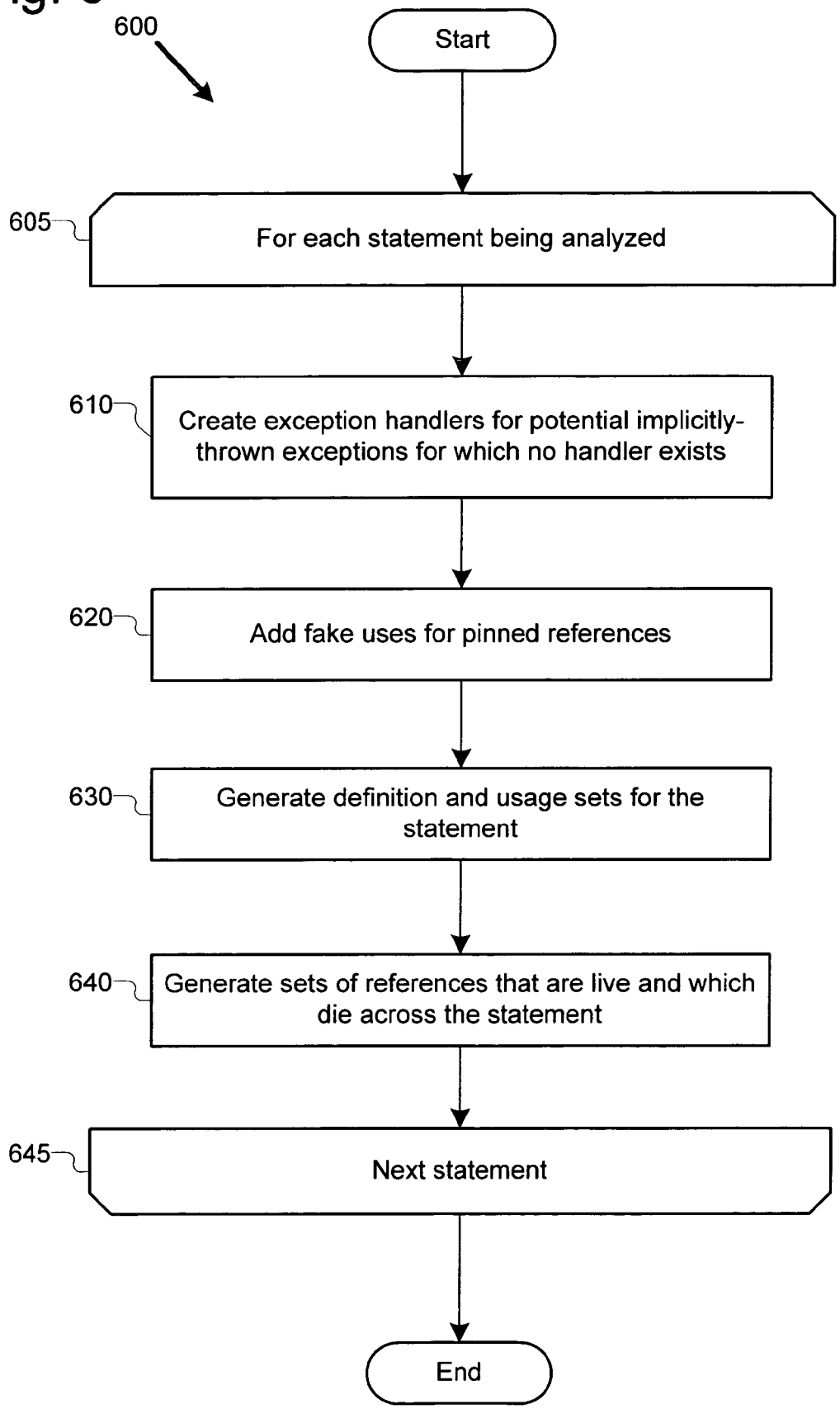
FIG. 6 is a flowchart illustrating an example process for performing a liveness analysis on an internal compiler representation of a program.

The live-range analysis is the second stage of the eager RC instrumentation process. FIG. 6 illustrates an example process 600 performed by the liveness analysis module 220 for determining when references will be live during execution. In one implementation, process 600 corresponds to block 440 of FIG. 4. In various implementations, the illustrated process blocks may be merged, divided into subblocks, or omitted. The process begins at block 605, where it enters a loop that operates over every statement in the IR. In alternative implementations, the loop may be limited to a particular section or function of the program.

At block 610, a default exception handler is created against the currently analyzed statement for every exception that it could implicitly throw and for which a handler does not already exist. The default handler simply catches and re-throws the exception via the throw statement.

Next at block 620, fake uses for pinned references are added. This is done because an RC decrement cannot be inserted after the last use of a pinned reference r since the object that it targets must be held until its redefinition or until the end of its lexical scope. Furthermore, simply considering r as live throughout a function is not sufficient because an RC decrement is needed just before each of r's redefinitions. Instead, the live ranges of r need to be stretched so that they span the definition points of r and so that they extend until the end of the body of the function that r is found in. This can be done by (a) introducing a fake use of r into each statement that must define r, and by (b) introducing fakeuse(r) as the last statement in basic blocks that return control from the function. After this extension and the ensuing liveness calculations, the insertion process performed by the RC injection module 230 automatically achieves the pinned semantics for r.

At block 630, definition and usage sets are generated for the current statement. In one implementation, for a statement s of a basic block, the sets $defs_{must}(s)$ and $uses_{may}(s)$ are defined as the sets of local references that must be defined at s and which may be used at s respectively.

Finally, at block 640, the sets of references that are live at a statement, and that die across it, are generated. In one implementation, this is performed based on the following equation, which relates the local references that are live before and after the statement s:

$$live_{in}(s) = (live_{out}(s) - defs_{must}(s)) \cup uses_{may}(s).$$

This equation is applied on the function's statements in reverse order, starting from its exit basic block and proceeding to its entry basic block. For the exit basic block, two kinds of references are considered live at its end: (1) those returned from the function, and (2) those expressly thrown (using the throw statement) from basic blocks lacking handlers for the exception.

From the above sets, the set of local references that die across a statement s is $$dieacross(s) = (live_{in}(s) \cup defs_{must}(s)) - live_{out}(s).$$

Hence dieacross(s) is exactly the set of references against which RC decrements are required just after s, assuming three conditions hold: (1) heap references are not defined in s; (2) local references are not both used and defined in s; and (3) the set of local references that may be defined in s (for example, through interior pointers) is the same as defs$_{must}$(s). However, the injection process described below is resilient to any of these conditions not holding.

After block 640, the process continues on to block 645, where it is repeated for the next statement.

3.3 Examples of RC Injection

The RC injection stage is the third stage of the eager RC instrumentation process 400. FIG. 7 illustrates an example process 700 performed by the RC injection module 230 for adding RC updates to the IR. In one implementation, process 700 corresponds to block 460 of FIG. 4. In various implementations, the illustrated process blocks may be merged, divided into subblocks, or omitted.

Generally, RC updates are inserted by this stage over three steps using liveness information. The first step injects RC increments and decrements against heap and local references immediately after statements. It should be noted that only statements that exist before this stage are considered in this step. The second step injects RC increments against references thrown using throw and for which there is an exception handler in the function. The injection happens just before the throw statement. The third step introduces RC decrements on references which die in a basic block into that basic block's exception header, if it has one.

Thus, the process begins at block 705, where the process enters a loop that repeats for each statement in the IR. Inside the loop, the process continues to decision block 710, where the RC injection module determines if the current statement is a call statement. As noted above in one implementation, exception assignments and the fakedef statement are considered call and non-call instructions respectively for the purposes of process 700. Also, in one implementation, allocation instructions of the form r:=newobj( )

where r is a reference to a new object, are considered call statements for the purposes of injection. (Note that under this implementation, an RC increment is not inserted after the allocation statement because objects have a reference count of 1 when first allocated.)

If, at decision block 710, the module determines that the statement is a call statement, the process continues to block 720, where RC decrements are injected after the call statement for all references that die across the statement. Apart from the RC decrements against them, no other RC updates or assignments are injected. In particular, no RC increments are present before the call against the actual reference parameters because the necessary increments occur on entry into the function. IP arguments as well need no special consideration because they are indirectly taken care of through their shadows, as discussed above with respect to FIG. 5. And no RC increment is applied on the returned reference because an increment would have already occurred in the called function when the return parameter is defined. As mentioned above, returned references are considered live on exit from a function. Therefore, they will not be subjected to an RC decrement in the function after their last definition.

Thus for $d_i \in$ dieacross(s), a function call r:=f(x, y, . . . ) becomes the set of instructions:

$r := f(x, y, ...)$
▷ $RC_-(d_1)$
▷ $RC_-(d_2)$
⋮
▷ $RC_-(d_m)$.

Here, $RC_-(r)$ and $RC_+(r)$ represent RC increment and decrement instructions on the object targeted by the reference r. Also note that if r is null, then these operations become no-ops.

If instead, the RC injection module determines at decision block 710 that the statement is not a call statement, more complex RC injections are used. These injections are performed with reference to various sets of references for the current statement. The context of the sets is based on liveness information that can be derived from a static analysis of the IR. Thus, in one implementation, the sets are referred to as follows: Let ldefs(s) be the set of l-value expressions of all references (stack and heap) that may be defined at a statement s, and let L (Q) be the set of l-values for variables in the set Q. The remaining sets used during RC injection are:

$u_i \in$ defs$_{must}$(s) ∩ uses$_{may}$(s), $a_i \in$ defs$_{must}$(s), $d_i \in$ dieacross(s), $w_i \in$ defs$_{must}$(s) − uses$_{may}$(s), $p_i \in$ ldefs(s).

In a preferred implementation, the behavior of the RC injection module 230 depends on whether the compiler can establish that L (defs$_{must}$(s)) equals ldefs(s). Thus, at block 730, these l-value sets are compared. Then, at block 740, RC updates are injected based upon the comparison.

FIG. 8 illustrates an example process 800 performed by the RC injection module 230 for injecting RC updates after a non-call statement. In one implementation, process 800 corresponds to block 740 of FIG. 7. In various implementations, the illustrated process blocks may be merged, divided into subblocks, or omitted.

The process begins at decision block 805, where the RC injection module 230 determines if the sets L (defs$_{must}$(s)) and ldefs(s) are equivalent. If the two sets are found to be equivalent, references common to defs$_{must}$(s) and uses$_{may}$(s) are saved so that their old values are available for doing RC decrements after s. Thus, at block 810, these assignments are injected. Next, at block 820, RC increments are injected for all references defined in s. This is followed by injecting decrements against the temporaries at block 830. Thus, the use of temporaries allows former targets of redefined references to be decremented. Finally, at block 840, RC decrements are inserted against local references that die across s and the process ends.

Note that in the case of the trivial assignment z:=z, the inserted RC updates would cancel out; in particular, the RC increment against z would be balanced by the following RC decrement against the temporary that holds the previous value of z. This is why, in one implementation, formal references are initialized using fakedef statements in the process of FIG. 5 above and not by using trivial assignments.

Thus, for a non-call statement s for which L(defs$_{must}$(s))= ldefs(s), the following RC injections occur (variables with dot accents represent the temporaries):

▷ $i_1 := u_1$
▷ $i_2 := u_2$
⋮
▷ $i_k := u_k$
            s
▷ $RC_+(a_1)$
▷ $RC_+(a_2)$
⋮
▷ $RC_+(a_l)$
▷ $RC_-(i_1)$
▷ $RC_-(i_2)$
⋮
▷ $RC_-(i_k)$
▷ $RC_-(d_1)$
▷ $RC_-(d_2)$
⋮
▷ $RC_-(d_m)$

If, however, at decision block 805 the RC injection module 230 determines that $L(defs_{must}(s)) \neq ldefs(s)$, a different set of injections occurs. First, at block 850, null assignments are injected against the $w_j$ references, which are those references that must be defined in s but which are not used in s. This is done because RC decrements already exist at an earlier place since these references die before their redefinition in s. They are thus assigned null to preclude double decrements later when decrements against temporaries are made.

Next, at block 860, the module injects assignments to temporaries for references which may be defined in s. In one implementation, these assignments to temporaries apply the dereference operator ('*') on l-value expressions in ldefs(s) to obtain the old values of references potentially to be overwritten in s. Next, at block 870, RC increments are made against the potentially new references. Then the process proceeds to block 880, where the temporaries are subjected to RC decrements. Finally, at block 890, RC decrements are injected against the references that die across s and the process ends.

Thus, for a non-call statement s for which $L(defs_{must}(s)) \neq ldefs(s)$, the following RC injections occur:

▷ $w_1 := null$
▷ $w_2 := null$
⋮
▷ $w_n := null$
▷ $\bar{t}_1 := {}^*p_1$
▷ $\bar{t}_2 := {}^*p_2$
⋮
▷ $\bar{t}_k := {}^*p_k$
            s
▷ $RC_+({}^*p_1)$
▷ $RC_+({}^*p_2)$
⋮
▷ $RC_+({}^*p_k)$
▷ $RC_-(\bar{t}_1)$
▷ $RC_-(\bar{t}_2)$
⋮
▷ $RC_-(\bar{t}_k)$
▷ $RC_-(d_1)$
▷ $RC_-(d_2)$
⋮
▷ $RC_-(d_m)$ In an alternative implementation, not every increment and decrement is necessary; if an alias analysis can prove that a $p_j$ will point to a $w_q$, then the statements $w_q := null$, $\bar{t}_j := {}^*p$ and $RC_-(\bar{t}_j)$ can be omitted.

Returning to the process of FIG. 7, after RC updates are injected, the process loops again at block 750 if there are additional statements. After all statements have had RC updates injected against them, the process continues to block 760, where RC increments are inserted against throw statements. In one implementation, exceptions that are explicitly thrown from basic blocks without exception handlers are treated the same way as returned references. That is, no RC decrement against the thrown reference is injected after its last definition because the reference is considered live on exit from the function. This is why in one implementation exception assignments are regarded as call instructions for the purposes of decision block 710 above, since this prevents the injection of an RC increment against the exception variable when the exception is caught up the call stack.

On the other hand, when explicitly thrown references are caught in the same function, the absence of an RC increment against the exception variable must be countered by an RC increment at the point of the throw statement, or earlier.

Finally, there is one last concern. If a statement s were to throw an exception, then none of the ensuing RC updates shown above will get executed. In this case, injected RC increments for the throwing statement should not happen, because an exception-throwing s is assumed to create no side effects against the program's external state, as stated above. However, among the RC decrements, those that operate on the local references that die across s should still be performed.

Thus, at block 770, RC decrements are inserted into exception headers for any basic block which could throw an exception. In one implementation, for a basic block B with an exception header B', RC decrements are made against the set of references $$D' = \left( live_{in}(B) \cup \left( \bigcup_{s \in B} defs_{must}(s) \right) \right) - live_{in}(B')$$

where $live_{in}(B)$ and $live_{in}(B')$ are the live sets on entry to B and B'. The RC decrements are inserted into B'.

However, at execution time, RC decrements on a subset of D' will occur in B before an exception is actually thrown. To forestall another decrement in B' on references that have already died in B, in one implementation the $RC_-$ operation is imparted the following semantics: it resets its operand reference to null after decrementing the reference count of the targeted object. This solution naturally works because the $RC_-$ operation is always introduced at the death point of its operand. Under this implementation, the null assignments made during the process of block 850 are not necessarily required.

3.4 Examples of IR with Injected Eager RC Updates

Specific examples of concrete instructions handled by the above-described techniques are getfield in the Java language and ldfld in MSIL (Microsoft Intermediate Language). An IR representation of either is o.f, where o is a local reference and f a field. As noted above, from the point of view of the injection process, this is considered a non-call instruction. As such, the following is an example of code emitted by the compiler in a specific instance:

$$o := o.f \Rightarrow \triangleright i_1 := o$$
$$o := o.f$$
$$\triangleright RC_+(o)$$
$$\triangleright RC_-(i_1)$$

In this example, $defs_{must}(s)=\{o\}$, $uses_{may}(s)=\{o\}$ and $ldefs(s)=\{\&o\}$. Since $L(defs_{must}(s))=ldefs(s)$, the code generated corresponds to that generated by the process of blocks 810-840 of FIG. 8.

Another example is the IR instruction cmpxchg, which mimics the compareExchange method of the system.Threading.Interlocked class in .NET. cmpxchg takes an interior pointer p to a reference, a pair of references x and y and compares x with the reference at p for equality. If equal, the reference at p is replaced by y and the original reference at p is returned. If unequal, only the reference at p is returned. The following shows the code after execution of the insertion process, which regards the statement as a non-call instruction:

$$r := cmpxchg(p, x, y) \Rightarrow \triangleright i_1 := {}^*p$$
$$\triangleright i_2 := {}^*(\&r)$$
$$r := cmpxchg(p, x, y)$$
$$\triangleright RC_+({}^*p)$$
$$\triangleright RC_+({}^*(\&r))$$
$$\triangleright RC_-(i_1)$$
$$\triangleright RC_-(i_2)$$
$$\triangleright RC_-(d_1)$$
$$\triangleright RC_-(d_2)$$
$$\vdots$$
$$\triangleright RC_-(d_m)$$

In this example, $defs_{must}(s)=\{r\}$ and $ldefs(s)=\{p,\&r\}$. Thus, depending on whether an alias analysis can prove that p always equals $\&r$, either of the two patterns generated in the process 800 of FIG. 8 could be generated. The code shown here is when $L(defs_{must}(s)) \neq ldefs(s)$.

It is also worth noting that three optimizations are possible on the injected code in this example. First, $^*(\&r)$ is replaceable by r. Second, $RC_-(i_2)$ is a no-op since $i_2:={}^*(\&r)$ will be null, either because it has just been initialized, or because an $RC_-(r)$ would have already occurred at a preceding death point of r. Third, $RC_+({}^*(\&r))$ and $RC_-(i_1)$ cancel out because after the cmpxchg operation, r equals $i_1$. Given an optimizing compiler, these optimizations could create increased efficiencies in the eager RC-instrumented program.

4. Examples of RC Subsumption Analysis 4.1 Examples of RC Subsumed References

FIGS. 9a-9d illustrate an example of reference-counting subsumption. The example is based on the following IR, which displays code after the eager RC update insertion process is complete. In the example, y's last use is in line 5 and x's is in line 7.

```
1    x := ...
2  ▷ RC_+(x)
     ⋮
3    y := x
4  ▷ RC_+(y)
     ⋮
5    ... := ... y ...
6  ▷ RC_-(y)
     ⋮
7    ... := ... x ...
8  ▷ RC_-(x)
```

Figure 9A:
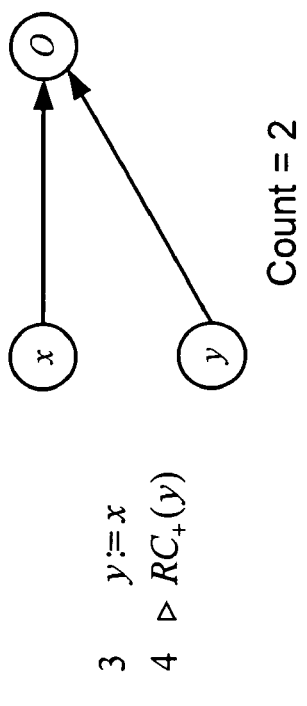
FIGS. 9a-9d are diagrams showing an example of a reference which is RC subsumed by another reference.
Figure 9B:
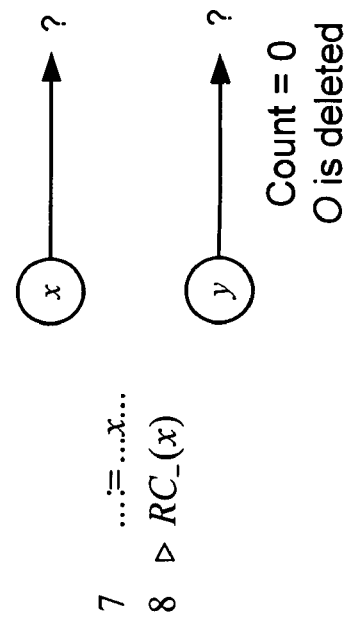
Figure 9C:
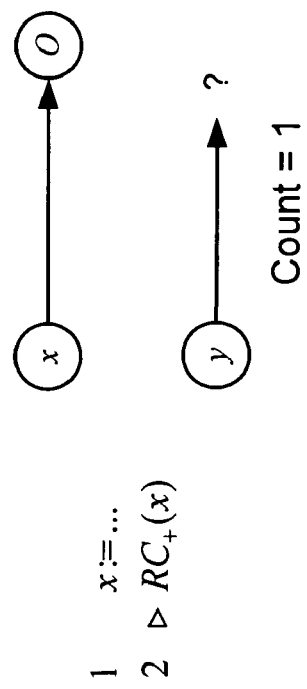
Figure 9D:
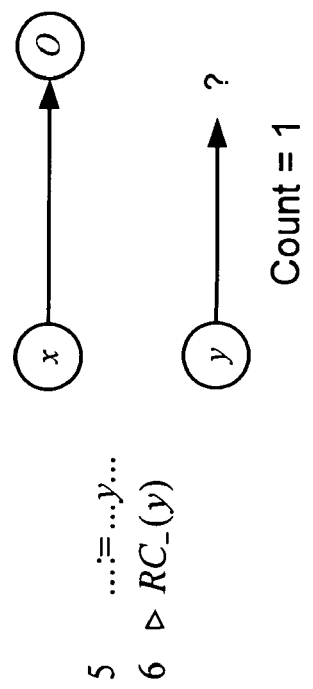

In the example, FIGS. 9a-9d shows the state of the two references x and y as they are defined to point to an object O by the code example given above. In FIG. 9a, lines 1 and 2 have executed, and thus x has been assigned to refer to O, and y's referenced object is unknown or does not exist. FIG. 9a also shows the reference count on O to be 1, because of the RC increment in line 2 (for the sake of simplicity, the example assumes no other references point to O). Next, in FIG. 9b, y has been assigned to refer to the same object as x. At this point, both y and x refer to O and the reference count on O has been incremented to 2. Then, in line 5 of FIG. 9c, y is used for the last time in the function, and in line 6, there is an RC decrement on y due to the eager nature of the RC updates. This means, as FIG. 9c shows, that currently only x refers to O, and the reference count on O is back to 1. Finally, by FIG. 9d, lines 7 and 8 have executed, which causes the last use of x to execute, and therefore a decrement to execute on x, which brings the count for O to 0, and causes the reclamation of O's memory.

Altogether, FIGS. 9a-9d demonstrate that, as far as the reclamation of O's allocated memory is concerned, the RC updates toy do not affect the deletion of O. Because y points to the same object as x in its live range from Line 3 to Line 6 (note that this is the "new" live range of y, as extended by the inserted RC decrement on y), and since this live range is contained in that of x, the RC updates on Lines 4 and 6 are superfluous to the garbage collection of O. This redundancy holds true even in a multithreaded, multiprocessor setting. Herein, we say that "y is RC subsumed by x" to describe this state of affairs.

It turns out that of the RC updates introduced into real programs by the eager RC insertion procedures described above, a large number are on local references that are RC subsumed by local references on which RC updates are also introduced. For instance, the RC updates on formal references are often redundant because formal reference parameters are usually RC subsumed by actual reference parameters. The goal of the RC subsumption analysis described herein is to locate such subsumed references. An RC subsumption optimization would then remove RC updates on these references, resulting in fewer garbage collection-related calls during program execution and therefore increased throughput.

While the discussion above is given in the context of eager RC updates, RC subsumption can also occur when RC updates are inserted according to classic RC collection schemes. As an example, consider the IR

```
1    x := newobj( )
     ⋮
2  ▷ RC₊(x)
3  ▷ RC₋(y)
4    y := x
5  ▷ RC₋(y)
6    y := null
     ⋮
7  ▷ RC₋(x)
8    x := null
``` in which newobj( ), as before, returns a new object with reference count of 1, and in which RC updates are inserted according to a classic RC collection scheme. Since y points to the same object as x in its live range from Line 4 to Line 5, and since this live range is contained in the live range from Line 1 to Line 7 of x, the RC updates on Lines 2 and 5 are superfluous. (Note that the decrement against y on Line 3 is not superfluous, as it is performed to decrement the reference count of the object that y is about to be swung away from due to the assignment on Line 4.) Thus, as this example shows, RC subsumption can also occur when RC updates are inserted according to a classic RC collection scheme.

Formally, a local reference variable y is said to be always RC subsumed by a local reference variable x if the following three provisions hold:

1 every live range of y is contained in a live range of x;

2 y is never live through a redefinition of either x or y; and 3 the set of objects reachable from y is always a subset of the set of objects reachable from x (formally written as $\Re(y) \subseteq \Re(x)$).

The second provision is added because liveness is typically not known with 100% confidence before execution. In other words, if a more relaxed $uses_{may}$ or a more constrained $defs_{must}$ is developed in the liveness analysis above, then a variable could end up being considered live at a program point even though it may never be used from that point onward prior to a redefinition.

This has a subtle consequence on RC subsumption. Consider the following IR example, wherein RC updates are inserted for eager RC collection:

```
1    x := newobj( )
     ⋮
2    y := x
3  ▷ RC₊(y)
4  ▷ i₁ := *p
5    *p := z
6  ▷ RC₊(*p)
7  ▷ RC₋(i₁)
     ⋮
8    ... := ... y ...
```

-continued
```
9  ▷ RC₋(y)
     ⋮
10   ... := ... x ...
11 ▷ RC₋(x)
```

In the example, x and y will be considered live through line 5 when no information about the locations pointed to by p is available. However, if the RC increment on line 3 was not present (such as if y were assumed to be subsumed) and the store operation on line 5 overwrites y, then the reference count of the object targeted by x could be prematurely fall to zero after line 7. This is even though the third provision above might continue to be true after line 5. A similar example can be shown wherein overwriting x one line 5 prematurely reduces the reference count of the object targeted by y to zero.

Ascertaining the three provisions of RC subsumption at compile time is complicated by two factors. Firstly, live ranges may not be nice linear stretches such as shown in the example of FIGS. 9a-9d. They can more generally be thought of as "webs" spanning multiple definitions and multiple last uses. Secondly, object reachability as stated in the third provision is a dynamic, run-time trait and may not always be statically determinable. However, approximations of reachability, even if conservative, can be determined at compile time, and live ranges can be determined using interference graph construction notions.

4.2 Examples of General Subsumption Processes

Figure 10:
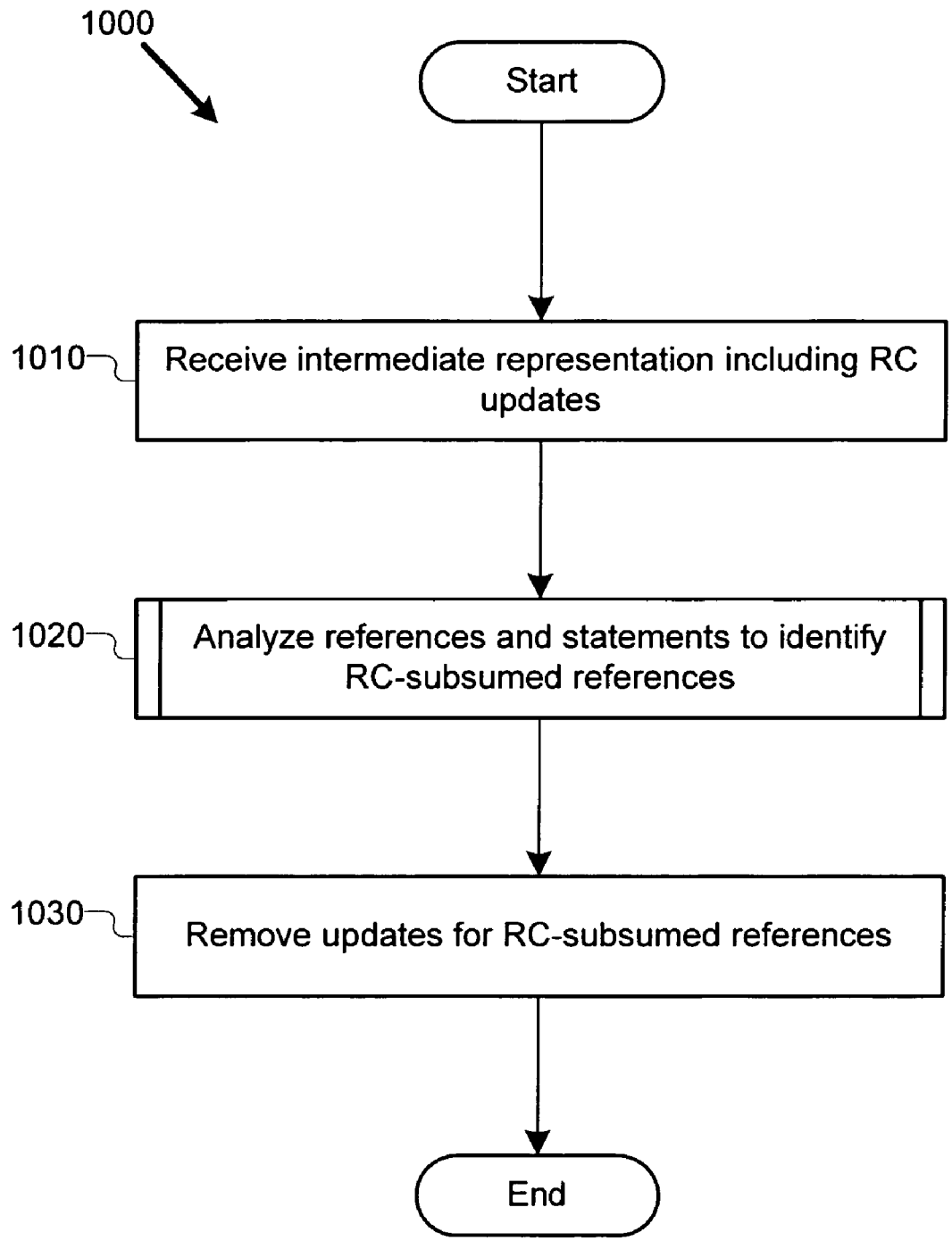
FIG. 10 is a flowchart illustrating an example process for performing an RC subsumption optimization on an internal compiler representation of a program.

FIG. 10 illustrates an example process 1000 performed by the RC subsumption optimization module 140 for identifying RC-subsumed references and removing RC updates to those references. In one implementation, process 1000 corresponds to block 370 of FIG. 3. In various implementations, the illustrated process blocks may be merged, divided into subblocks, or omitted. The process begins at block 1010, where the RC subsumption optimization module 140 receives a program IR that includes RC updates. Typically, the RC updates are provided by the eager RC insertion procedures described above, but in another implementation, process 1000 can be performed on a program that comprises RC updates generated through a different mechanism such as that for achieving classic RC collection.

Next, at block 1020, the module analyzes references and statements in the IR to identify RC-subsumed references. A particular example of this process is described below with respect to FIG. 11. Next, at block 1030, the redundant RC update removal module 270 removes RC updates for RC-subsumed references from the IR and the process ends.

4.3 Examples of Subsumption Analysis Processes

Figure 11:
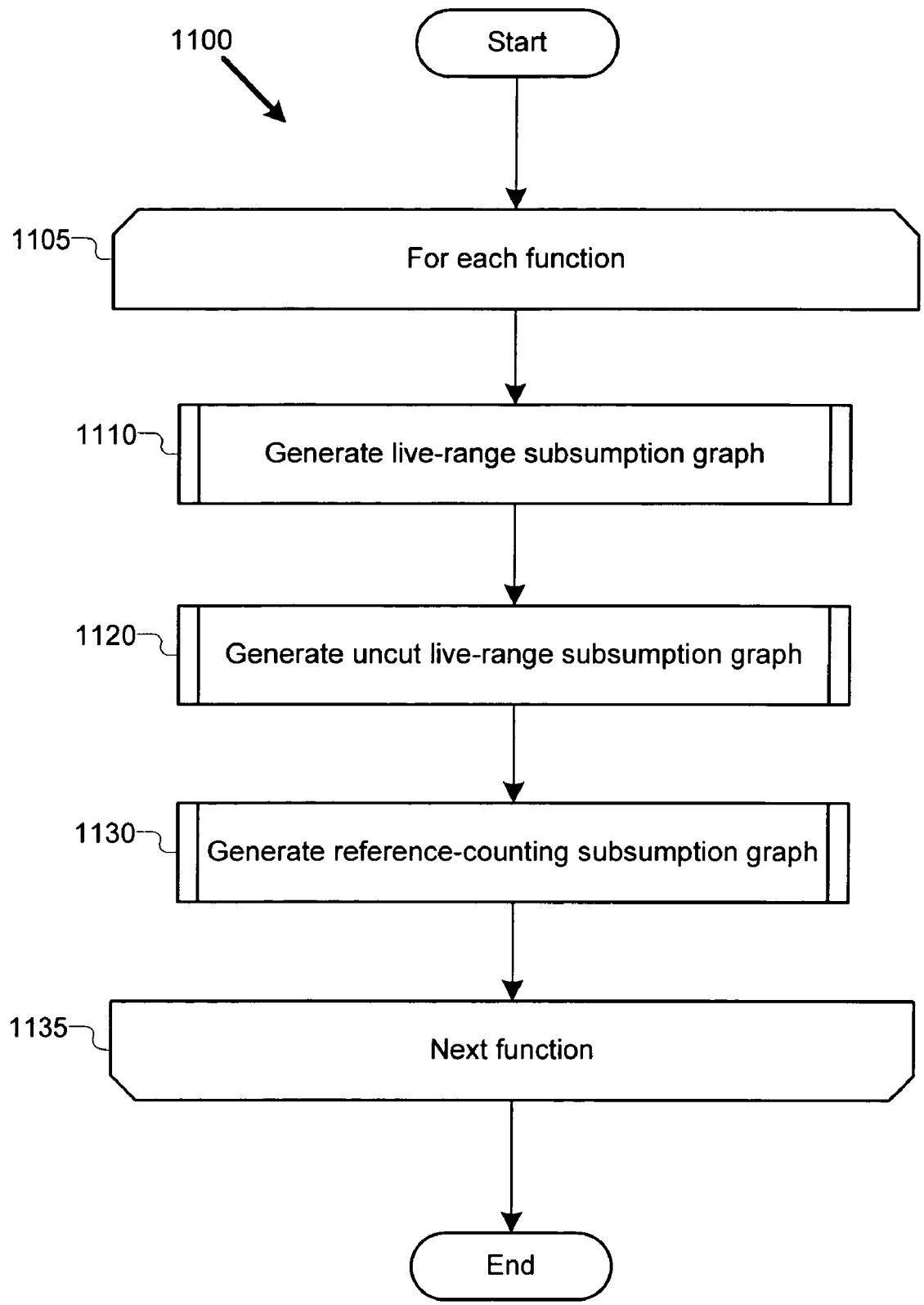
FIG. 11 is a flowchart illustrating an example process for performing an RC subsumption analysis on an internal compiler representation of a program.

FIG. 11 illustrates an example process 1100 performed by the RC subsumption optimization module 140 for analyzing an IR to identify RC-subsumed references. In one implementation, process 1100 corresponds to block 1020 of FIG. 10. In various implementations, the illustrated process blocks may be merged, divided into subblocks, or omitted.

In one implementation, the process operates on a function-by-function basis. Thus, the process begins in a loop over functions in the IR at block 1105. In various implementations, process 1100 may be performed on every function in a given IR, or may operate only on a subset of the set of all functions. Next, at block 1110, the live-range subsumption graph module 240 builds a live-range subsumption graph $G_L=(V,E_L)$ for a given function f. Nodes in $G_L$ denote local references and directed edges represent live-range containment. That is, $(u,v) \in E_L$ if and only if the live ranges of u in f are contained in the live ranges of v.

Next, at block 1120, the uncut live-range subsumption graph module 250 determines a subgraph $G_U$ of $G_L$ called the uncut live-range subsumption graph. The uncut live-range subsumption graph $G_U=(V,E_U)$ has the additional property that if $(u, v) \in E_U$, then u is never live through a redefinition of either itself or v. Finally, at block 1130, the reference-counting subsumption graph module 260 determines a subgraph $G_R=(V,E_R)$ of $G_U$ such that if $(u,v) \in E_R$, then u is always RC subsumed by v. $G_R$ will be referred to as the RC subsumption graph for the function $f$. This graph identifies those references which are RC subsumed in the function, and thus which ones can have their RC updates removed.

Finally, at block 1135, the loop repeats for the next function. The subsequent sections describe processes for generating each of the three graphs.

4.4 Examples of Live-Range Subsumption Graph Generation

Figure 12:
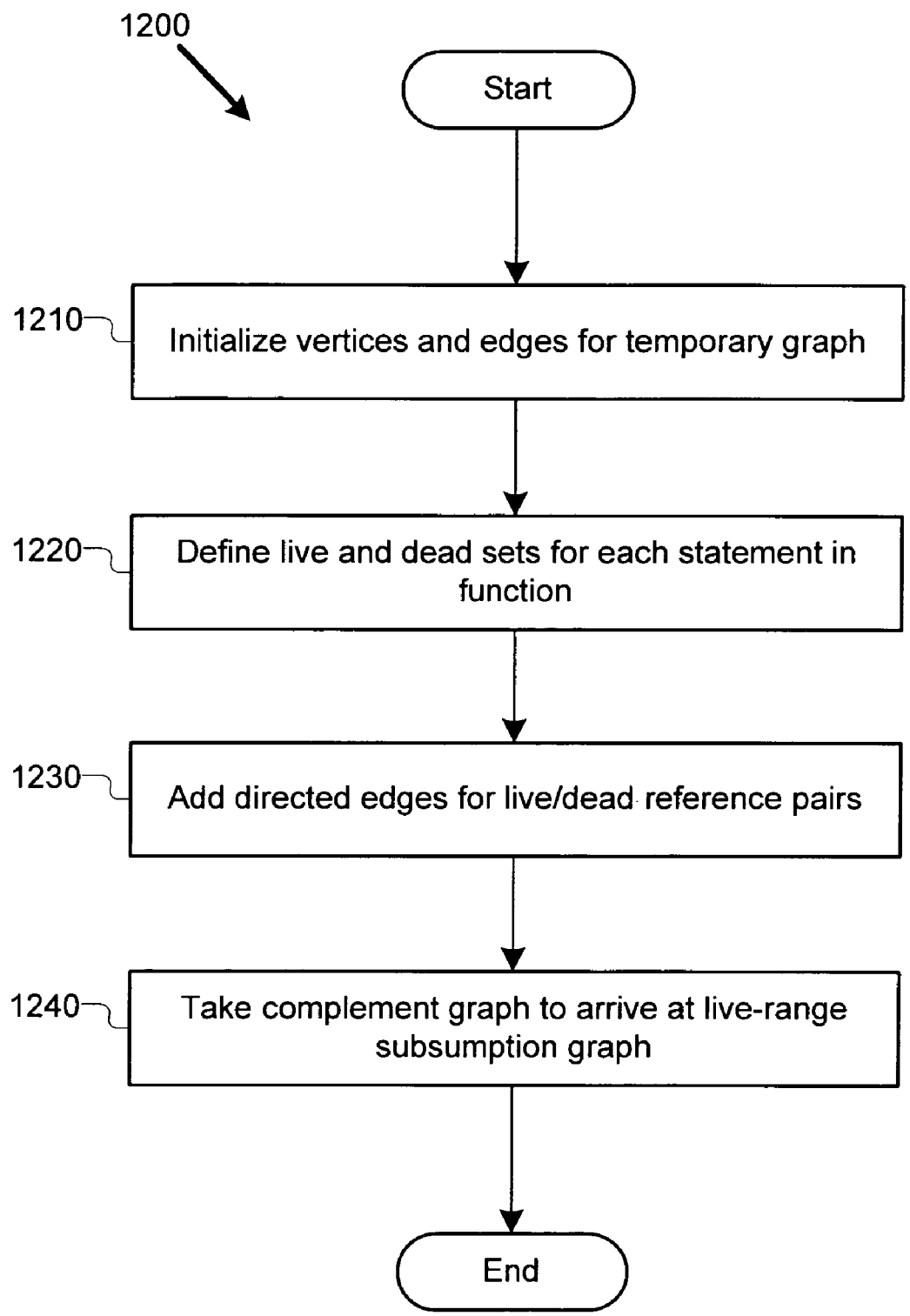
FIG. 12 is a flowchart illustrating an example process for generating a live-range subsumption graph.

In one implementation, the live range of a program variable u is a collection of "du-chains" that connect one or more definitions of u with one or more of its last uses. A live range of u could therefore be non-empty, if it includes at least one program point, or empty, if u is never used. When no live range of u contains the program point P, u is said to be dead at P. Thus, if u is live and v is dead at some P, then not every live range of u can be contained in a live range of v. This fact can be used to build a live-range subsumption graph. FIG. 12 illustrates an example process 1200 performed by the live-range subsumption graph module 240 for generating a live-range subsumption graph for a function. In one implementation, process 1200 corresponds to block 1110 of FIG. 11. In various implementations, the illustrated process blocks may be merged, divided into subblocks, or omitted. The process generates the live-range subsumption graph by generating a temporary graph that has edges (u,v) where u is live at a point where v is dead, and then taking the complement graph of this temporary graph.

The process begins at block 1210, where a temporary graph is set up by initializing its set of vertices V to be the set of local references R in the function, and by initializing its set of edges E to be Ø. Next, at block 1220, live and dead sets are defined for each statement in the function. In one implementation, the sets are defined as follows:

$$live_{wtn}(s) = live_{out}(s) - defs_{must}(s),$$

$$dead_{wtn}(s) = R - live_{wtn}(s),$$

$$dead_{in}(s) = R - live_{in}(s),$$

$$dead_{out}(s) = R - dead_{out}(s).$$

In the equations above, $live_{wtn}(s)$ is the live set within s, just before variables in $defs_{must}(s)$ are assigned to, but just after the variables in $uses_{may}(s)$ have been used. $live_{wtn}(s)$ is therefore the smallest live set encountered when traversing through s, from its front to its back. In one implementation, it is assumed that at any program point P within or on the boundaries of s, live(P) is either $live_{in}(s)$, $live_{wtn}(s)$ or $live_{out}(s)$.

Next, at block 1230, directed edges are added to E to represent pairs of references where one is live and the other is dead. Thus, in one implementation, an edge (u,v) is added to E if one or more of the following conditions hold for u, v, and s:

$$u \in live_{in}(s) \wedge v \in dead_{in}(s),$$

$$u \in live_{wtn}(s) \wedge v \in dead_{wtn}(s),$$

$$u \in live_{out}(s) \wedge v \in dead_{out}(s).$$

Finally, at block 1240, the complement graph $(V,\overline{E})$ of (V,E) is taken. Because of the definitions used above, $(u,v) \in \overline{E}$ if and only if the live ranges of u are contained in the live ranges of v. Thus, $(V,\overline{E})$ is the live-range subsumption graph $(V,E_L)$. The process then ends. In one implementation, if N is the number of statements in a function's CFG, then the worst-case complexity of this process is $O(|V|^2|N|)$. This is on a par with the complexity of constructing interference graphs.

4.5 Examples of Uncut Live-Range Subsumption Graph Generation

Figure 13:
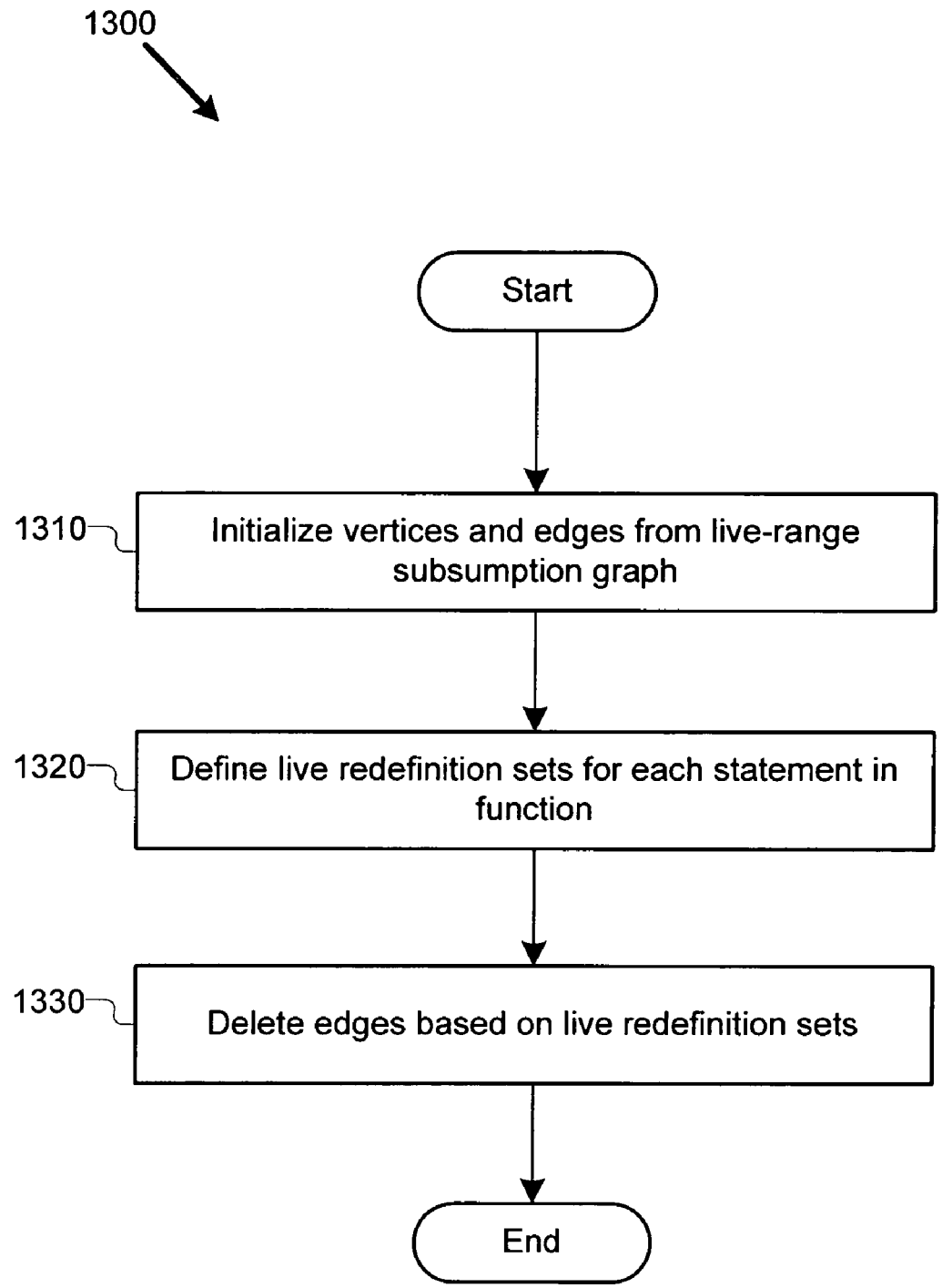
FIG. 13 is a flowchart illustrating an example process for generating an uncut live-range subsumption graph.

FIG. 13 illustrates an example process 1300 performed by the uncut live-range subsumption graph module 250 for generating a live-range subsumption graph for a function. In one implementation, process 1300 corresponds to block 1120 of FIG. 11. In various implementations, the illustrated process blocks may be merged, divided into subblocks, or omitted.

The process begins at block 1310, where a set of vertices V for the uncut live-range subsumption graph are initialized to the set of local references R and a set of edges E' is initialized to $E_L$, taken from the previously derived live-range subsumption graph. Next, at block 1320, live redefinition sets are defined for each statement in the function. In one implementation, the definitions are as follows:

$$live_{io}(s) = live_{in}(s) \cap live_{out}(s),$$

$$live_{thru}(s) = (R - defs_{must}(s)) \cap live_{io}(s),$$

$$live_{rdef}(s) = defs_{may}(s) \cap live_{thru}(s).$$

Here, $live_{thru}(s)$ is the set of references that are live through a statement s and $defs_{may}(s)$ is the set of local references that may be defined at s. Then the set $live_{rdef}(s)$ consists of references that may be live through their own redefinition. Next, at block 1330, the uncut live-range subsumption graph module 250 uses this set to arrive at $G_U$ by eliminating all outgoing edges from nodes in $live_{rdef}(s)$, and those among the incoming edges to these nodes that are from nodes whose references are live through s. Formally, this is done in one implementation by deleting $(u,v) \in E'$ if $u \in live_{rdef}(s)$ as well as deleting $(y,u) \in E'$ if $y \in live_{thru}(s)$ and $u \in live_{rdef}(s)$. The edges that remain, after all s have been accounted for, will therefore satisfy the first and second provisions above; thus (V,E') is the uncut live-range subsumption graph $(V,E_U)$. At this point the process ends.

A modest estimate of $defs_{may}(s)$, obtainable with an alias analysis, is important to the algorithm's efficacy as $G_U$ could otherwise lose all or most of its edges. A tighter $defs_{may}(s)$ also improves the algorithm's running time, which in the worst case is $O(|V|^2|N|)$.

4.6 Examples of RC Subsumption Graph Generation

Figure 14:
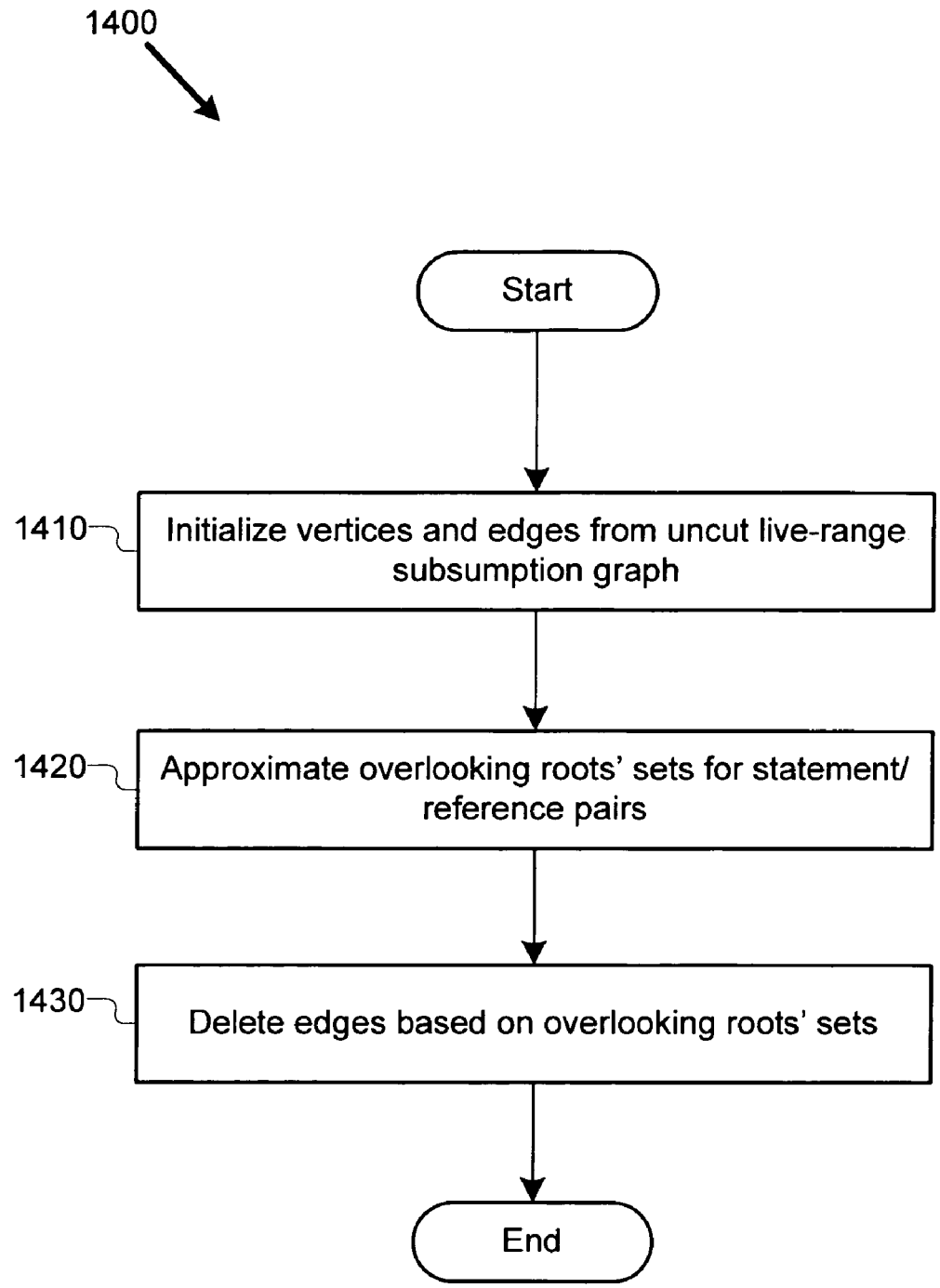
FIG. 14 is a flowchart illustrating an example process for generating a reference-counting subsumption graph.

FIG. 14 illustrates an example process 1400 performed by the RC subsumption graph module 260 for generating an RC subsumption graph for a function. In one implementation, process 1400 corresponds to block 1130 of FIG. 11. In various implementations, the illustrated process blocks may be merged, divided into subblocks, or omitted.

Generally, the process of FIG. 14 starts with a copy E" of $E_U$ and then eliminates edges that may possibly violate the third provision, as discussed in section 4.1 above. The process does this by reference to the overlooking roots' set $\mathbb{R}(s,y)$, which is the set of local references that "overlook" the object targeted just after a statement s by a live reference y. In one implementation, the set is defined for a statement s and a reference y as follows:

$$\mathbb{R}(s, y) = \left\{ x \,\middle|\, x \in R \wedge y \in live_{out}(s) \wedge y \xrightarrow{\beta(s)} \omega \wedge \omega \in \right.$$

$$\left. \mathbb{R}(x) \text{ on all paths from } \alpha(s) \text{ until } x \text{ dies or is redefined} \right\}$$

where the notation $$y \xrightarrow{P} \omega$$

indicates that the local reference y targets the object ω at the program point P, and α(s) and β(s) are program points just before and after a statement s. Hence, references in $\dot{R}(s,y)$ overlook the object from just before s, at which they are implicitly live by the equation, until their death or possible redefinition.

As an example, if s were the IR statement y:=x and y∈lives$_{out}$(s), then x∈$\dot{R}(s,y)$. Because determining an overlooking roots' set is difficult or impossible to do statically, in one implementation an approximation $\hat{R}(s,u)$ of the set $\dot{R}(s,u)$ is used. Thus, $\hat{R}(s,u) \subseteq \dot{R}(s,u)$ for all s and u∈R.

The process begins at block 1410, where a set of vertices V is initialized to the set of local references R and a set of edges E" is initialized to $E_U$, which is taken from the previously derived uncut live-range subsumption graph. Next, at block 1420, overlooking roots' sets are approximated for different reference/statement pairs. Example implementations of such approximations are described below in Section 4.7.

Next, at block 1430, edges are deleted from E" based on the approximated sets. In one implementation, an edge (u,v), where u≠v, is deleted under two circumstances:

1. there exists an s that may define u, but at the end of which there is no known reference that overlooks u; or
2. there exists an s that may define u, and at the end of which u is overlooked by a w (≠v) that may not be RC subsumed by v.

Formally this is done by the following procedure, using the terminology succ(u) to denote the successor nodes of u in (V,E"). For every u∈defs$_{may}$(s) such that the approximation $\hat{R}(s,u)=\emptyset$, define $$\sigma(s,u) = succ(u) - \{u\}$$

and delete (u,v)∈E" if v∈σ(s,u). For every u∈defs$_{may}$(s) such that the approximation $\hat{R}(s,u) \neq \emptyset$, define $$\sigma(s, u) = \bigcup_{w \in \hat{R}(s,u)} (succ(u) - (succ(w) \cup \{u, w\}))$$

and delete (u,v)∈E" if v∈σ(s,u). Repeat these removals on every statement until a fixed point is reached. At this point, (V,E") is the RC subsumption graph (V,E$_R$) and the process ends.

4.7 Examples of Overlooking Roots' Set Approximation

First, it is important to note that the process of FIG. 14 uses an $\hat{R}(s,u)$ only for those statements s for which u∈defs$_{may}$(s). Additionally, one approximation for $\hat{R}(s,u)$ was demonstrated above for statements of the form u:=v. In another implementation, a $\hat{R}(s,u)$ can be created for a statement s with the IR form u:=v.g where g is a read-only field. In one implementation, a field is read-only if it is not modified after its initialization in any thread. Because the initialization is just after object construction for instance fields and just after static construction for static fields, if such a statement occurs after the initialization point for g, and if u∈live$_{out}$(s), then a possible value for $\hat{R}(s,u)$ is {v}. Similarly, for u:=u.g a possible value for $\hat{R}(s,u)$ is {u} if u∈live$_{out}$(s).

Another implementation provides an approximation for the IR statement u:=v[e]

where u∈live$_{out}$(s), v points to a thread-local object, and v[e] is not written into before v dies or is possibly redefined in a current thread's code. In this circumstance, v can be added to $\hat{R}(s,u)$.

Yet another implementation provides an approximation for the IR statement u:=v.f where u∈live$_{out}$(s), and f is not a read-only field, but v is known to only target thread-local objects and v.f is not written into before v dies. In this circumstance, v can be added to $\hat{R}(s,u)$.

In another implementation, the fake initialization z:=fakedef( )

which is inserted against a formal reference to realize an eager RC collection scheme, can also provide an approximation. The initialization can be imagined as z:=$\hat{z}$ where $\hat{z}$ is the actual parameter that corresponds to z. In this case, if $\hat{z}$∈R and z∈live$_{out}$(s), where s is the fake initialization statement, then $\hat{z}$ can be added to $\hat{R}(s,z)$. Now $\hat{z}$ can be considered live throughout a function ƒ. Thus, if $\hat{z}$ were included in the set of vertices V, then (z,$\hat{z}$) would exist in $E_U$ only if z is never live through a redefinition of either itself or $\hat{z}$. This extension to the processes above, combined with $\hat{z}$∈$\hat{R}$(s, z), enables the process of FIG. 14 to automatically handle the RC subsumption of formal references by actual references.

The above opportunity also exists under a classic RC collection scheme because a formal parameter z can always be imagined as being initialized by the assignment z:=$\hat{z}$ on entry to the function ƒ:

4.8 Example Generation of an RC Subsumption Graph

The following IR is of a function map that takes as arguments a reference z to a hash table and a reference F to a function object that enables method invocation through references. Thus, map traverses through the linked lists of a hash table, which are organized as an array of buckets, and applies F on the stored values along the way. The example given herein is not specific to eager RC garbage collection; it could be found in a program using a classic RC collection scheme.

```
1    function map(F, z)
2      ▷F := F̂
3      ▷z := ẑ
4      x := z.buckets
5      i := 0
6      while (i < x.length),
7        y := x[i]
8        while (y ≠ null),
9          w := y.value
```

-continued

| 10 | y := y.next |
| 11 | F(w) |
| 12 | end while |
| 13 | i := i + 1 |
| 14 | end while |

Note that Lines 2 and 3 represent imaginary assignments that model a call-by-value parameter passing mechanism. Next, to compute the RC subsumption graph for map, approximations are made for each of the overlooking roots' set. For this function, the approximations are as follows:

$\dot{\mathbb{R}}(s_2,F)=\{\hat{F}\}$, $\dot{\mathbb{R}}(s_3,z)=\{\hat{z}\}$, $\dot{\mathbb{R}}(s_4,x)=\{z\}$, $\dot{\mathbb{R}}(s_7,y)=\{x\}$, $\dot{\mathbb{R}}(s_9,w)=\{y\}$, $\dot{\mathbb{R}}(s_{10},y)=\{y\}$.

The determination of the approximations $\dot{\mathbb{R}}(s_2,F)$ and $\dot{\mathbb{R}}(s_3,z)$ is straightforward. The values for the other four approximations rely on the immediate targets of z, x and y being thread-local objects. This is the case if the hash tables passed into map at the various call sites in the program do not escape threads.

FIGS. 15a and 15b show the RC subsumption graph $G_R$ created from an uncut live-range subsumption graph $G_U$ by using these approximations of the overlooking roots' sets. Since FIG. 15b shows that F, x, z, y and w are all RC subsumed by a reference other than themselves, the RC updates against them are all removable. This allows map to have no RC updates.

9. Computing Environment

The above reference-counting insertion and RC subsumption optimization techniques can be performed on any of a variety of computing devices. The techniques can be implemented in hardware circuitry, as well as in software executing within a computer or other computing environment, such as shown in FIG. 16.

Figure 16:
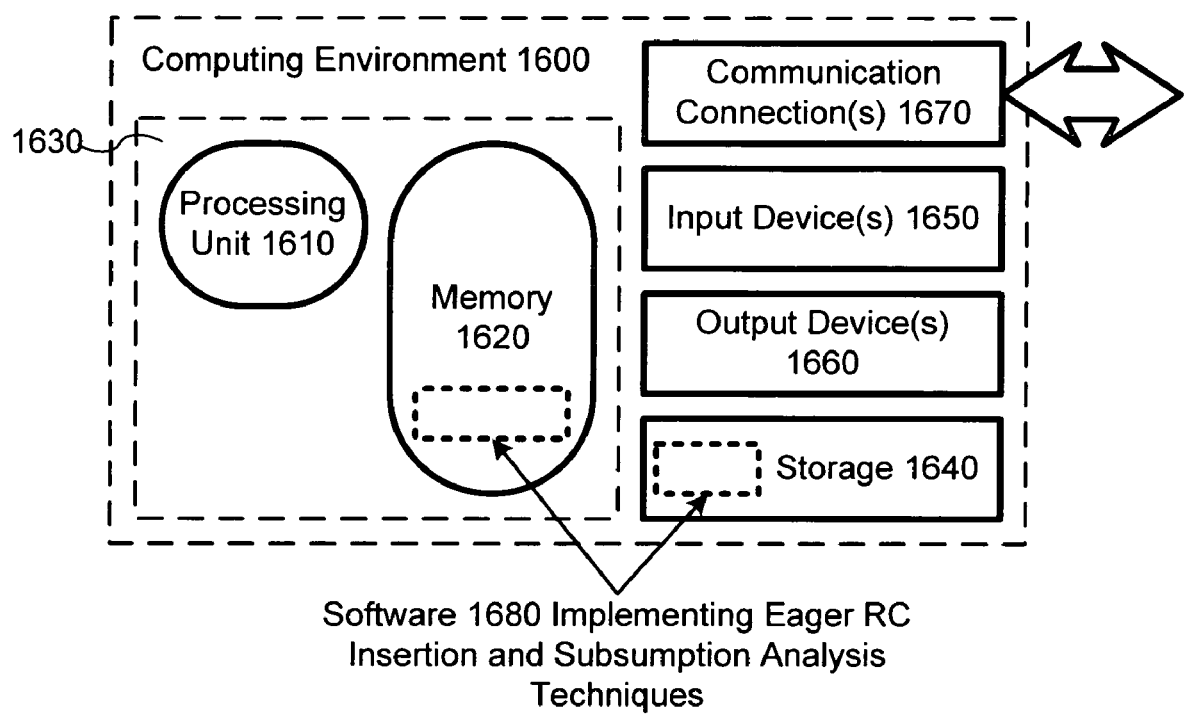
FIG. 16 is a block diagram of a suitable computing environment for implementing the eager reference-counting techniques of FIG. 3 and the subsumption techniques of FIG. 10.

FIG. 16 illustrates a generalized example of a suitable computing environment (1600) in which described embodiments may be implemented. The computing environment (1600) is not intended to suggest any limitation as to the scope of use or functionality of the invention, since the present invention may be implemented in diverse general-purpose or special-purpose computing environments.

With reference to FIG. 16, the computing environment (1600) includes at least one processing unit (1610) and memory (1620). In FIG. 16, this most basic configuration (1630) is included within a dashed line. The processing unit (1610) executes computer-executable instructions and may be a real or a virtual processor. In a multiprocessing system, multiple processing units execute computer-executable instructions to increase processing power. The memory (1620) may be volatile memory (e.g., registers, cache, RAM), non-volatile memory (e.g., ROM, EEPROM, flash memory, etc.), or some combination of the two. The memory (1620) stores software (1680) implementing the described techniques.

A computing environment may have additional features. For example, the computing environment (1600) includes storage (1640), one or more input devices (1650), one or more output devices (1660), and one or more communication connections (1670). An interconnection mechanism (not shown) such as a bus, controller, or network, interconnects the components of the computing environment (1600). Typically, operating system software (not shown) provides an operating environment for other software executing in the computing environment (1600), and coordinates activities of the components of the computing environment (1600).

The storage (1640) may be removable or non-removable, and includes magnetic disks, magnetic tapes or cassettes, CD-ROMs, CD-RWs, DVDs, or any other medium which can be used to store information and which can be accessed within the computing environment (1600). The storage (1640) stores instructions for the software (1680) implementing the described techniques.

The input device(s) (1650) may be a touch input device such as a keyboard, mouse, pen, or trackball, a voice input device, a scanning device, or another device that provides input to the computing environment (1600). For audio, the input device(s) (1650) may be a sound card or similar device that accepts audio input in analog or digital form, or a CD-ROM reader that provides audio samples to the computing environment. The output device(s) (1660) may be a display, printer, speaker, CD writer, or another device that provides output from the computing environment (1600).

The communication connection(s) (1670) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment (1600), computer-readable media include memory (1620), storage (1640), communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc., which perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "interpolate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

I claim:

1. A method of lowering a number of reference-counting updates in a program utilizing reference-counting garbage collection, the method comprising:
determining subsumed references which are subsumed by subsuming references in the program; and
removing reference-counting updates on the subsumed references;
wherein a first reference is considered to be subsumed by a second reference when the first and second references satisfy the following conditions:
1) every live range of the first reference is contained in a live range of the second reference;
2) the first reference is never live through a redefinition of either the first or the second reference; and
3) a set of every object which is reachable from the first reference is a subset of a set of every object which is reachable from the second reference;
wherein determining references which are subsumed by other references in the program comprises:
generating a reference-counting subsumption graph for each of one or more functions in the program by:
(a) building a live-range subsumption graph for the function;
(b) building an uncut live-range subsumption graph for the function; and
(c) building the reference-counting subsumption graph for the function; and
analyzing the reference-counting subsumption graph to determine which references are represented in the graph as being subsumed by other references.

2. The method of claim 1, further comprising performing a static analysis on references in the program to obtain reference information; and
wherein the subsumed references are determined based at least in part on the reference information.

3. The method of claim 1, wherein determining subsumed references which are subsumed by subsuming references comprises for pairs of references in the program, determining if the three conditions are satisfied.

4. The method of claim 1, wherein building the live-range subsumption graph for the function comprises:
creating a first graph with vertices representing references in the function;
for a first reference and a second reference out of the references represented in the graph, adding an edge from a vertex representing the first reference to a vertex representing the second reference if, at a program point in the function, the first reference is live and the second reference is dead; and
generating a complement graph from the first graph as the live-range subsumption graph.

5. The method of claim 1, wherein building the uncut live-range subsumption graph comprises, for a first reference and a second reference, deleting an edge from the live-range subsumption graph between vertices who represent the first and second references if the first reference is live through a redefinition of either the first or second reference.

6. The method of claim 1, wherein building the reference-counting subsumption graph comprises deleting edges from the uncut live-range subsumption graph between vertices which represent first and second references such that a maximal set of objects reachable by the first reference is not a subset of a maximal set of objects reachable by the second reference.

7. The method of claim 6, wherein deleting edges from the uncut live-range subsumption graph comprises:
approximating one or more overlooking roots' sets for statements and references in the function;
analyzing the approximated overlooking roots' sets to determine edges to delete; and
deleting the determined edges.

8. The method of claim 7, wherein approximating one or more overlooking roots' sets comprises adding references to an overlooking roots' set based at least in part on constraints on usage of references.

9. The method of claim 8, wherein adding references to the overlooking roots' set comprises, for a statement of type u:=v.g, where g is a read-only field and u is live leaving the statement, adding v to the overlooking roots' set which corresponds to u and the statement.

10. A computer-implemented program analysis system for determining redundant reference-counting updates in a program, the system comprising:
one or more computer processors; and
a reference-counting subsumption analysis module operable to execute on the one or more computer processors, the module configured to accept a control-flow graph for a program and produce one or more reference-counting subsumption graphs which indicate references in the control-flow graph that are subsumed by other references;
wherein the reference-counting subsumption analysis module comprises:
a live-range subsumption graph module configured to generate one or more live-range subsumption graphs from the control flow graph, wherein each live-range subsumption graph indicates a relation between a first and a second reference if every live range of the first reference is contained in a live range of the second reference;
an uncut live-range subsumption graph module, configured to generate one or more uncut live-range subsumption graphs from the one or more live-range subsumption graphs, wherein each uncut live-range subsumption graph indicates a relation between a third and a fourth reference if the third reference is never live through a redefinition of either the third or the fourth reference; and
a reference-counting subsumption graph module, configured to generate one or more reference-counting subsumption graph from the one or more uncut live-range subsumption graphs, wherein each reference-counting subsumption graph indicates a relation between a fifth and a sixth reference if a set of objects reachable from the fifth reference is always a subset of a set of objects reachable from the sixth reference.

11. The computer-implemented program analysis system of claim 10, wherein the reference-counting subsumption graph module is configured to generate the one or more reference-counting subsumption graphs at least in part by utilizing approximated overlooking roots' sets.

12. One or more storage media comprising computer-executable instructions for performing a method for identifying unnecessary reference-counting updates in a function contained in a program that uses reference-counting garbage collection, the method comprising:
determining references which are subsumed in the function; and
removing reference-counting updates for the subsumed references from the function;

wherein a first reference is considered to be subsumed by a second reference when the first and second references satisfy the following conditions:
  1) every live range of the first reference is contained in a live range of the second reference;
  2) the first reference is never live through a redefinition of either the first or the second reference; and
  3) a set of every object which is reachable from the first reference is a subset of a set of every object which is reachable from the second reference;
wherein determining subsumed references comprises:
  determining the three conditions for a third reference and a fourth reference in the function by:
    (a) generating a reference-counting subsumption graph; and
    (b) using information represented in the reference-counting subsumption graph for the third and fourth references to identify whether reference-counting updates to the a reference out of the third and fourth references are unnecessary; and
  if the conditions are met, considering the third reference to be subsumed by the fourth reference.

13. The storage media of claim 12, wherein the method further comprises performing static analysis on the function in order to determine liveness information and overlooking roots' sets and the reference-counting subsumption graph is generated at least in part based on the liveness information and the overlooking roots' sets.

* * * * *